US010298612B2

United States Patent
Galula et al.

(10) Patent No.: US 10,298,612 B2
(45) Date of Patent: May 21, 2019

(54) SYSTEM AND METHOD FOR TIME BASED ANOMALY DETECTION IN AN IN-VEHICLE COMMUNICATION NETWORK

(71) Applicant: Argus Cyber Security Ltd., Tel Aviv (IL)

(72) Inventors: Yaron Galula, Kadima (IL); Ofer Ben-Noon, Rishon-LeZion (IL); Oron Lavi, Kfar Saba (IL)

(73) Assignee: Argus Cyber Security Ltd., Tel Aviv (IL)

( * ) Notice: Subject to any disclaimer, the term of this patent is extended or adjusted under 35 U.S.C. 154(b) by 186 days.

(21) Appl. No.: 15/196,301

(22) Filed: Jun. 29, 2016

(65) Prior Publication Data

US 2016/0381068 A1   Dec. 29, 2016

Related U.S. Application Data

(60) Provisional application No. 62/185,929, filed on Jun. 29, 2015.

(51) Int. Cl.
*G06F 21/00*   (2013.01)
*H04L 29/06*   (2006.01)
(Continued)

(52) U.S. Cl.
CPC ...... *H04L 63/1441* (2013.01); *B60R 16/0231* (2013.01); *B60R 16/0232* (2013.01); *B60R 21/01* (2013.01); *B60R 25/10* (2013.01); *B60R 25/30* (2013.01); *G07C 5/0816* (2013.01); *G07C 5/0841* (2013.01); *H04L 63/02* (2013.01); *H04L 63/123* (2013.01); *H04L 63/1416* (2013.01); *H04L 63/1425* (2013.01); *H04L 63/20* (2013.01); *H04L 67/12* (2013.01);
(Continued)

(58) Field of Classification Search
CPC ............................ H04L 63/1441; H04L 63/02
See application file for complete search history.

(56) References Cited

U.S. PATENT DOCUMENTS

| 6,236,365 | B1 | 5/2001 | Leblanc et al. |
| 6,556,900 | B1 | 4/2003 | Brynielsson |

(Continued)

FOREIGN PATENT DOCUMENTS

| EP | 1128627 | 8/2001 |
| EP | 1309132 | 5/2003 |

OTHER PUBLICATIONS

Extended European Search Report for EP Application No. 16176885 dated Oct. 7, 2016.
(Continued)

*Primary Examiner* — Morshed Mehedi
(74) *Attorney, Agent, or Firm* — Pearl Cohen Zedek Latzer Baratz LLP

(57) ABSTRACT

A system and method for providing security to a network may include maintaining, by a processor, a model of an expected behavior of data communications over the in-vehicle communication network; receiving, by the processor, a message sent over the network; determining, by the processor, based on the model and based on a timing attribute of the message, whether or not the message complies with the model; and if the message does not comply with the model then performing, by the processor, at least one action related to the message.

19 Claims, 12 Drawing Sheets

---

EXAMINING A FIRST AND SECOND VALUES OF A SIGNAL IN A RESPECTIVE FIRST AND SECOND MESSAGES IN A PLURALITY OF MESSAGES — 1010

IF THE DIFFERENCE BETWEEN THE FIRST AND SECOND VALUES IS GREATER THAN A THRESHOLD THEN DETERMINING AT LEAST ONE OF THE FIRST AND SECOND MESSAGES IS RELATED TO AN ANOMALY — 1015

DETERMINING A RATE OF CHANGE OF A VALUE OF A SIGNAL BASED ON EXAMINING CONTENT IN THE PLURALITY OF MESSAGES — 1020

DETERMINING AT LEAST SOME OF THE PLURALITY MESSAGES ARE RELATED TO AN ANOMALY BASED ON COMPARING THE RATE OF CHANGE TO A THRESHOLD — 1025

(51) Int. Cl.
  *H04W 12/10*    (2009.01)
  *H04W 12/12*    (2009.01)
  *H04L 29/08*    (2006.01)
  *B60R 16/023*   (2006.01)
  *G07C 5/08*     (2006.01)
  *B60R 25/10*    (2013.01)
  *B60R 25/30*    (2013.01)
  *B60R 21/01*    (2006.01)

(52) U.S. Cl.
  CPC ........... *H04W 12/10* (2013.01); *H04W 12/12* (2013.01); *B60R 2021/01197* (2013.01)

(56) References Cited

U.S. PATENT DOCUMENTS

| | | | |
|---|---|---|---|
| 7,333,481 | B1 | 2/2008 | Rawat et al. |
| 9,469,261 | B1 | 10/2016 | Thomas et al. |
| 9,792,435 | B2 | 10/2017 | Harris et al. |
| 9,843,594 | B1 | 12/2017 | Evans et al. |
| 2007/0052586 | A1* | 3/2007 | Horstemeyer ... G06Q 10/06311 342/457 |
| 2010/0256835 | A1* | 10/2010 | Mudalige .............. G08G 1/163 701/2 |
| 2012/0304007 | A1 | 11/2012 | Hanks et al. |
| 2014/0165191 | A1 | 6/2014 | Ahn et al. |
| 2014/0250531 | A1 | 9/2014 | Moeller et al. |
| 2015/0020152 | A1* | 1/2015 | Litichever .............. H04L 63/14 726/1 |
| 2015/0029987 | A1 | 1/2015 | Addepalli et al. |
| 2015/0113638 | A1 | 4/2015 | Valasek et al. |
| 2015/0172306 | A1 | 6/2015 | Kim et al. |
| 2015/0222708 | A1 | 8/2015 | Addepalli et al. |
| 2015/0256276 | A1 | 9/2015 | Jones |
| 2016/0028763 | A1 | 1/2016 | Cruz Mota et al. |
| 2016/0173505 | A1 | 6/2016 | Ichihara |
| 2016/0188396 | A1* | 6/2016 | Sonalker ............. G06F 11/0739 714/37 |
| 2016/0197932 | A1 | 7/2016 | Hoffman et al. |
| 2016/0205194 | A1 | 7/2016 | Kisihikawa et al. |
| 2016/0212162 | A1 | 7/2016 | Cain et al. |
| 2016/0315958 | A1 | 10/2016 | Munetoh |
| 2016/0365822 | A1 | 12/2016 | Tanabe |
| 2017/0093659 | A1 | 3/2017 | Elend et al. |

OTHER PUBLICATIONS

Muter M. et al. "A structured approach to anomaly detection for in-vehicle networks," in Information Assurance and Security (IAS), 2010 Sixth International Conference on IEEE, 2010, pp. 92-98.
European Office Action of EP Application No. 16 176 885.8 dated Dec. 4, 2017.
Office Action of U.S. Appl. No. 15/196,226 dated Sep. 29, 2017.
Final Office Action of U.S. Appl. No. 15/196,226 dated Mar. 13, 2018.
Office action of U.S. Appl. No. 15/196,338 dated Jul. 26, 2018.
Office action of U.S. Appl. No. 15/196,252 dated May 3, 2018.
Office action of U.S. Appl. No. 15/196,094 dated Jun. 18, 2018.
Cook et al., "Controller Area Network", EECS 461, Fall 2018, 8 Pages.
Larson et al., "An Approach to Specification-based Attack Detection for In-Vehicle Networks", 2008 IEEE Intelligent Vehicles Symposium, Eindhoven University of Technology, Eindhoven, the Netherlands, Jun. 4-6, 2008, pp. 220-225.
Muter et al., "Entropy-Based Anomaly Detection for In-Vehicle Networks", 2011 IEEE Intellignet Vehicles Symposium (IV), Baden-Baden, Germany, Jun. 5-9, 2011, pp. 1110-1115.

* cited by examiner

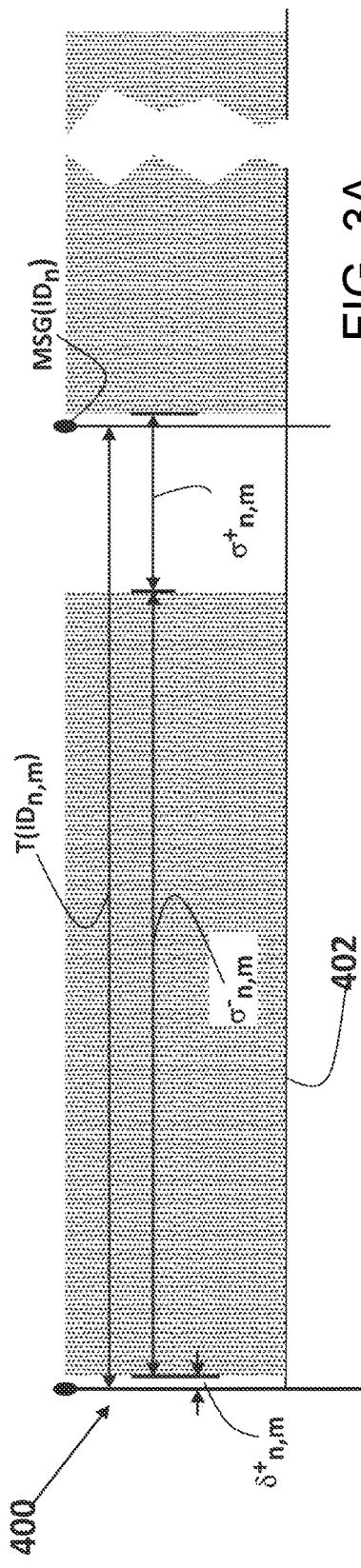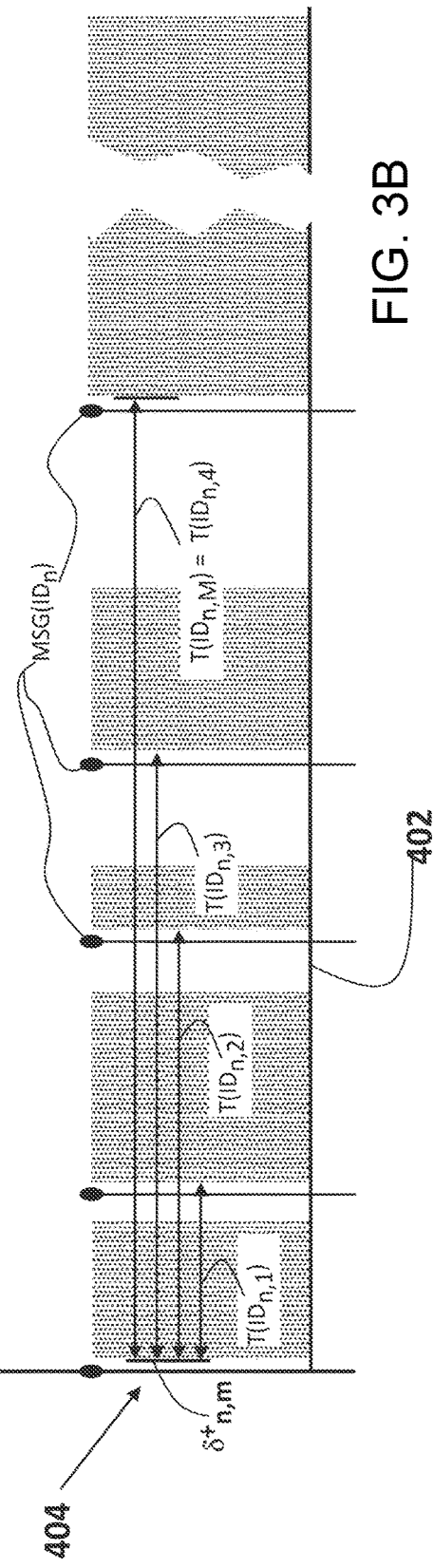

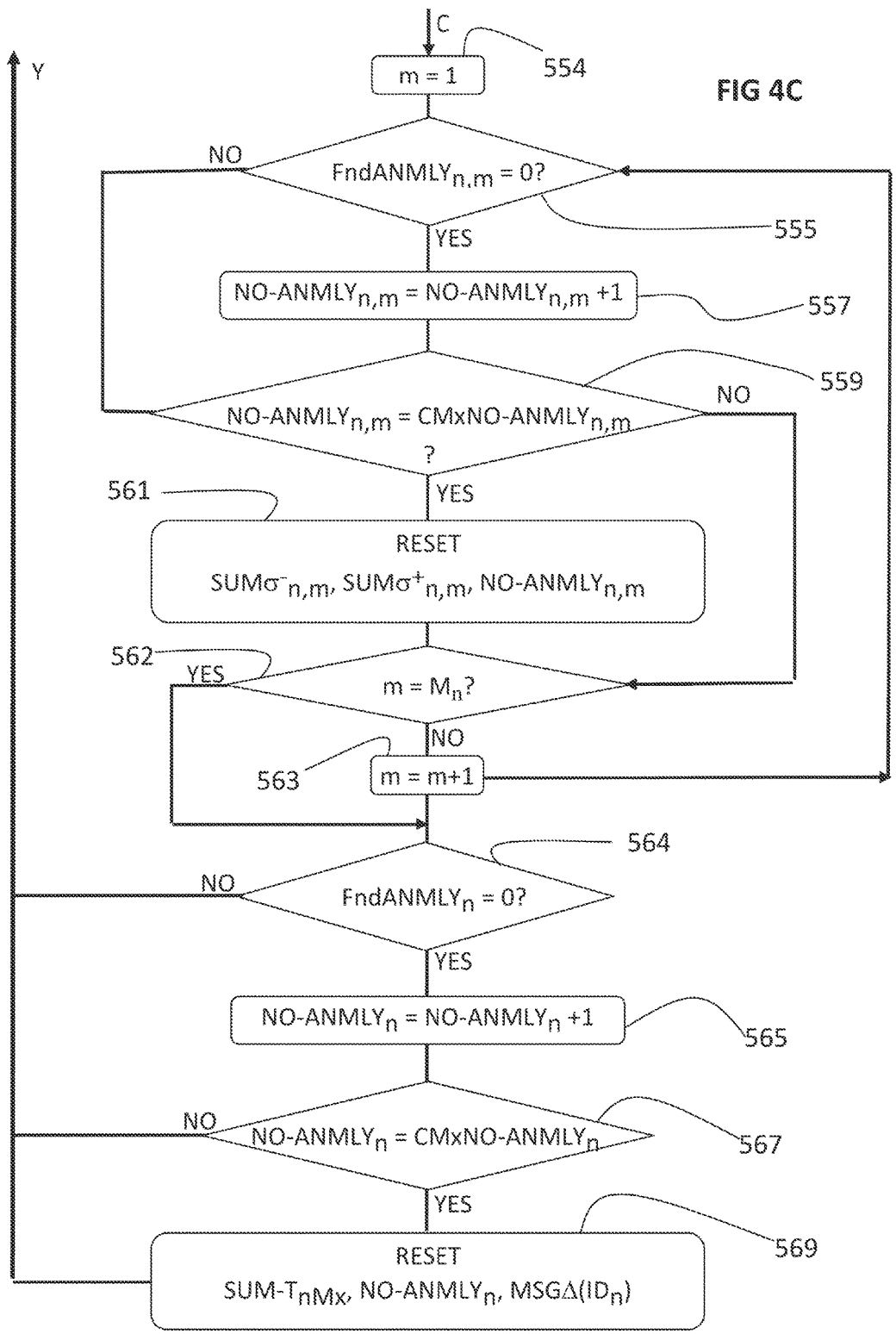

580

| ID | Interval1/ context1 | Interval2/ context2 | Interval3/ context3 | Threshold1 | Threshold2 | ACTION |
|---|---|---|---|---|---|---|
| 17 | 12/A | 16/B | 22/C | 22/C | 3 | 1 block<br>2 report<br>3 log |
| 3 | 15/A | 7/B | 4/C | 4/C | 5 | block |
| 6 | 2/A | 1/B | 3/C | 3/C | 2 | log |
| ... | | | | | | |

590

| CONTEXT | DESCRIPTION | CURRENT CONTEXT |
|---|---|---|
| A | ACCELERATION | X |
| B | ENGINE RUNNING | X |
| C | INFOTAINMENT SYSTEM ON | |
| D | NETWORK INTRUSION DETECTED | |
| E | FAULTY NODE ON NETWORK | |
| ... | | |

FIG. 5

| 581 | 810 | 815 | 820 | 825 | 587 | |
|---|---|---|---|---|---|---|
| ID | FUNCTION | CONTEXT | THRESHOLD | CONFIDENCE | ACTION | |
| 17 | FUNCTION-A | A | 3 | 7 | BLOCK | ~851 |
| 17 | FUNCTION-A | A | 3 | 3 | ALERT | ~852 |
| 17 | FUNCTION-A | B | 2 | 3 | RECORD EVENT | ~853 |
| 17 | FUNCTION-B | ... | ... | ... | ... | ~854 |
| ... | ... | ... | ... | ... | ... | |

SYSTEM AND METHOD FOR TIME BASED ANOMALY DETECTION IN AN IN-VEHICLE COMMUNICATION NETWORK

CROSS-REFERENCE TO RELATED APPLICATIONS

This application claims the benefit of U.S. Provisional Patent Application No. 62/185,929, entitled "The Anomalous Watchman", filed on Jun. 29, 2015, which is incorporated in its entirety herein by reference.

FIELD OF THE INVENTION

The present invention relates generally to detecting anomalous transmissions in communication networks. In particular, embodiments of the invention enable detecting anomalous messages in an in-vehicle communication network.

BACKGROUND OF THE INVENTION

Over the last half a century the automotive industry, has, initially slowly, and subsequently with great rapidity, been evolving from using mechanical control systems to control a vehicle's functions to electronic "drive by wire" control systems for controlling the functions. In mechanical vehicular control systems, a driver of a vehicle controls components of a vehicle that control vehicle functions by operating mechanical systems that directly couple the driver to the components via mechanical linkages. In drive by wire vehicle control systems, a driver may be coupled directly, and/or very often indirectly, to vehicle control components that control vehicle functions by electronic control systems and electronic wire and/or wireless communication channels, rather than direct mechanical linkages. The driver controls the control components by generating electronic signals that are input to the communication channels and the electronic control systems.

Typically, a vehicular electronic control system includes a user interface for receiving driver actions intended to control a vehicle function, transducers that convert the actions to electronic control signals, and a plurality of sensors and/or actuators that generate signals relevant to the function. In other cases, electronic control systems and sensors are used in, or for, autonomous cars (e.g., driverless cars, self-driving cars, robotic cars and the like) as known in the art. An electronic control unit (ECU) of the control system receives user generated signals and the signals generated by the sensors and/or actuators, and responsive to the signals, operates to control a vehicle component involved in performing the function. The ECU of a given control system may also receive and process signals relevant to performance of the function generated by, and/or by components in, other vehicle control systems. The sensors, actuators, and/or other control systems communicate with each other and the ECU of the given control system via a shared in-vehicle communication network, to cooperate in carrying out the function of the given control system. Messages sent over an in-vehicle network as described herein may include signals and/or signal values.

By way of example, a vehicle throttle by wire control system that replaces a conventional cable between an accelerator pedal and an engine throttle may include an electronic accelerator pedal, an ECU also referred to as an engine control module (ECM), and an electronic throttle valve that controls airflow and/or fuel injection into the engine and thereby controls power that the engine produces. The electronic accelerator pedal generates electronic signals responsive to positions to which a driver depresses the pedal. The ECM receives the accelerator pedal signals, and in addition electronic signals that may be generated by other sensors, actuators, and electronic control systems in the vehicle that provide information relevant to the safe and efficient control of the engine via an in-vehicle communication network. The ECM processes the driver input signals and the other relevant signals to generate electronic control signals that control the throttle. Among the other sensors actuators, and electronic control systems that may provide relevant signals to the ECM over the in-vehicle network are, air-flow sensors, throttle position sensors, fuel injection sensors, engine speed sensors, vehicle speed sensors, brake force and other traction control sensors included in a brake by wire system, and cruise control sensors. Typically, messages sent over an in-vehicle network as described herein include one or more signals or signal values. The terms message and signal as used herein may mean, or relate to, values sent by nodes on an in-vehicle network, accordingly, the terms message and signal may be used interchangeably herein.

In-vehicle communication networks of modern vehicles are typically required to support communications for a relatively large and increasing number of electronic control systems of varying degrees of criticality to the safe and efficient operation of the vehicles. A modern vehicle may for example be home to as many as seventy or more control system ECUs that communicate with each other and sensors and actuators that monitor and control vehicle functions via the in-vehicle network. The ECUs may, by way of example, be used to control in addition to engine throttle described above, power steering, transmission, antilock braking (ABS), airbag operation, cruise control, power windows, doors, and mirror adjustment.

In addition, an in-vehicle network typically supports on board diagnostic (OBD) systems and communication ports, various vehicle status warning systems, collision avoidance systems, audio and visual information and entertainment (known in the art as infotainment) systems and processing of images acquired by on-board camera systems. The in-vehicle network in general also provides access to mobile communication networks, e.g., WiFi and Bluetooth communication networks or systems, tire pressure monitor system (TPMS), vehicle to vehicle and vehicle to infrastructure communication (V2X), keyless entry system, the Internet, and global positioning systems (GPS).

Various communication protocols have been developed to configure, manage, and control communications of vehicle components that are connected to, and communicate over, an in-vehicle communication network. Popular in-vehicle network communication protocols currently available are control area network (CAN), an automotive network communications protocol known as FlexRay, Media Oriented Systems Transport (MOST), Ethernet, and local interconnect network (LIN). The protocols may define a hardware communication bus and how the ECUs, sensors and actuators, generically referred to as nodes, connected to the communication bus, access and use the bus to transmit signals to each other.

The growing multiplicity of electronic control systems, sensors, actuators, ECUs and communication interfaces and ports, that an in-vehicle communication network supports makes the in-vehicle communication network, and the vehicle components that communicate via the communication system, increasingly vulnerable to attempts (e.g., by hackers) to damage, destroy, or interfere with an operation of, an in-vehicle network, node or system (e.g., cyber-attacks as known in the art) that may dangerously compromise vehicle safety and performance In addition, the growing complexity of electronic control systems in vehicles makes it harder than before to identify and/or detect faults or malfunctions of, or related to, components and networks included in a vehicle.

SUMMARY OF THE INVENTION

In some embodiments, a timing model of an expected behavior of data communications over the in-vehicle communication network may be created, obtained, updated or maintained. A message sent over the network may be received; based on the timing model and based on a timing attribute of the message, it may be determined whether or not the message complies with the timing model; and, if the message does not comply with the timing model then performing, by the processor, at least one action related to the message.

A plurality of messages communicated over the network may be received, and a controller may determine, based on a timing model and based on timing attributes of the plurality of messages, whether or not at least one of the messages complies with the timing model, and, if at least one message in the plurality of messages does not comply with the timing model then the controller may perform at least one action related to the at least one message. A controller may receive a first and a second messages sent over the in-vehicle communication network, the first and second messages including the same ID value; and if a time lapse between receptions of the first and second messages is less than a time lapse threshold then the controller may determine that at least one of the first and second messages is related to an anomaly.

If a time lapse between receptions of a first and second messages including the same ID value is greater than a time lapse threshold, an embodiment may determine that at least one of the first and second messages is related to an anomaly. If a time lapse between receptions of a first and second messages is greater than a threshold then an embodiment may increase a counter, and if the counter is greater than a counter threshold then an embodiment may determine that at least one of the first and second messages is related to an anomaly, an embodiment may reset the counter to a predefined value if a predefined number of consecutive valid messages are identified.

A time lapse threshold included in the timing model may be dynamically modified. An embodiment may determine a context related to at least one of: a vehicle, a network, and a node connected to the network; and an embodiment may determine a message is related to an anomaly based on the context. An embodiment may identify an event related to at least one of: a vehicle, a network, and a node connected to the network and may determine a message is related to an anomaly based on the event.

An action related to a message may include isolating a portion of a network from the rest of an in-vehicle communication network in order to isolate a source of a message related to an anomaly. An embodiment may determine a component connected to an in-vehicle communication network is malfunctioning based on one or more messages and the embodiment may generate an indication related to the malfunctioning component. An embodiment may calculate a confidence level of a message being related to an anomaly and the embodiment may perform an action based on the confidence level.

An action related to the message may be performed and may be at least one of: disabling a component connected to the network, activating a component connected to the network, blocking a message, delaying a message, limiting a frequency of a message type, logging a message and alerting. An embodiment may compare a time lapse between receptions of a first and second messages to at least two a time lapse thresholds; and may determine at least one of the messages does not comply with a timing model if at least one of the time lapse thresholds is breached.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 3A schematically shows a timing diagram according to illustrative embodiments of the present invention;

FIG. 3B schematically shows a timing diagram according to illustrative embodiments of the present invention;

FIG. 4C shows a flowchart of a method according to illustrative embodiments of the present invention;

FIG. 5 shows an exemplary model according to some embodiments of the invention;

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

A system and method according to some embodiments of the invention may include or use one or more computing devices in order to detect or identify security threats, detect or identify events or states that may jeopardize the security or proper function of a system and/or a network. In some embodiments and as described, one or more computing devices may be used in order to enforce security in network. For example, a system according to some embodiments may include one or more computing devices 100 as described herein. It will be understood the enforcing security as referred to herein may include any security related operations, for example, enforcing security in a network may include detecting threats, logging or recording threats or intrusions, alerting and so on.

Figure 1A:
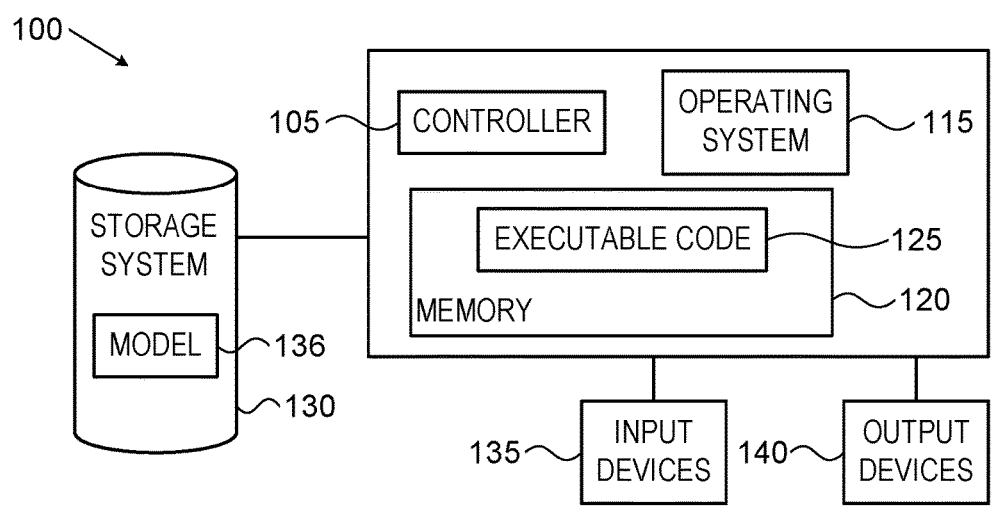
FIG. 1A shows high level block diagram of an exemplary computing device according to illustrative embodiments of the present invention.

Reference is made to FIG. 1A, showing a high level block diagram of an exemplary computing device according to some embodiments of the present invention. Computing device 100 may include a controller 105 that may be, for example, a central processing unit processor (CPU), a chip or any suitable computing or computational device, an operating system 115, a memory 120, executable code 125, a storage system 130 that may include a model 136, input devices 135 and output devices 140. Controller 105 (or one or more controllers or processors, possibly across multiple units or devices) may be configured to carry out methods described herein, and/or to execute or act as the various modules, units, etc. More than one computing device 100 may be included in, and one or more computing devices 100 may act as the components of, a system according to embodiments of the invention.

Figure 1B:
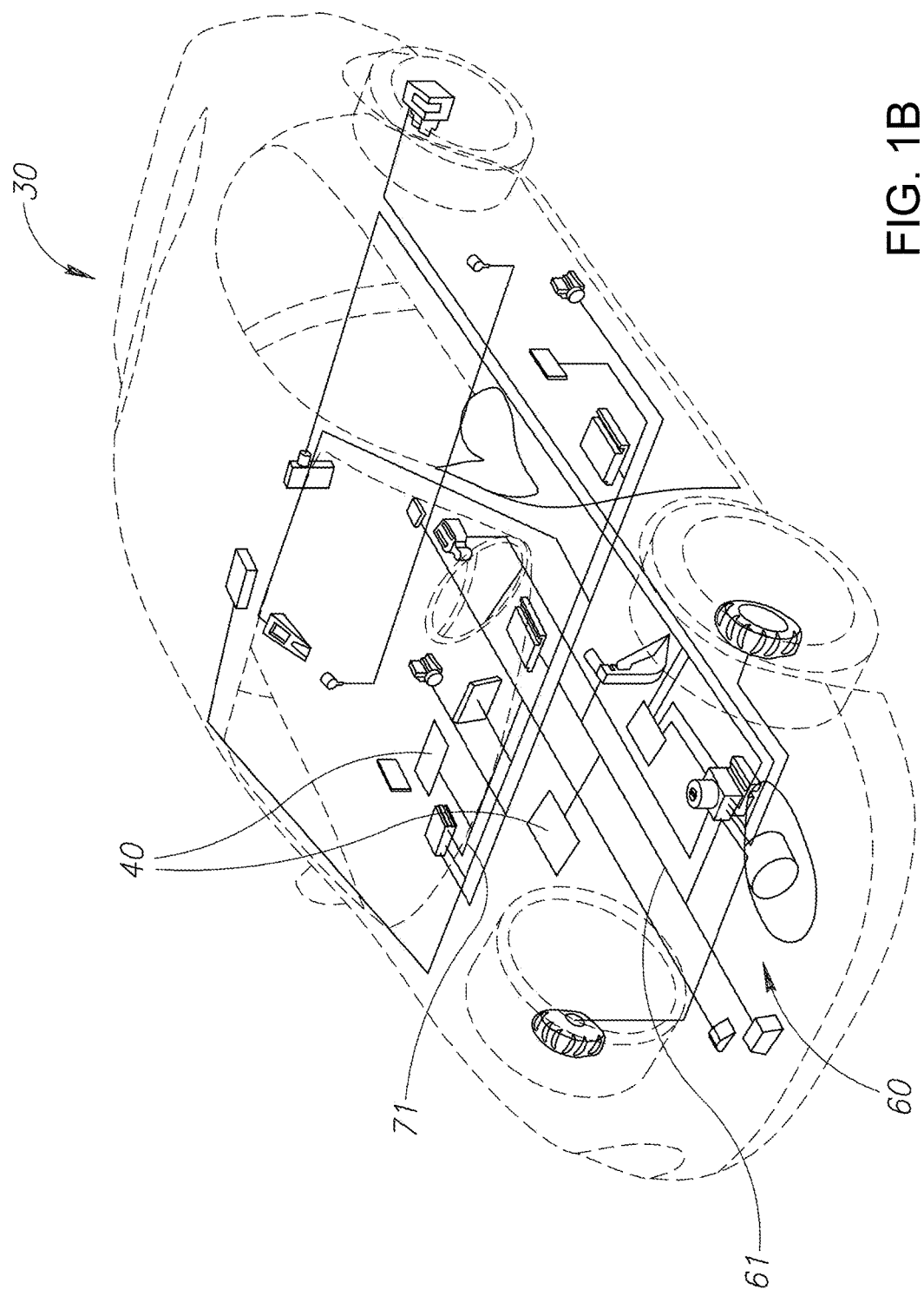
FIG. 1B schematically shows a vehicle and components of a system according to illustrative embodiments of the present invention.

For example, the components shown in FIG. 1B, e.g., on board, or in-vehicle, security enforcement units (SEUs) 40 (as further described herein) may be, or may include components of, computing device 100. For example, by executing executable code 125 stored in memory 120, controller 105, e.g., when included in a security enforcement unit as described, may be configured to carry out a method of enforcing security, signal analysis and/or cyber-security in a vehicle as described herein. For example, included in a security enforcement unit, controller 105 may be configured to enforce cyber-security in a vehicle, e.g., by: creating, storing and/or otherwise maintaining a timing, content, or other model for an expected behavior or for one or more messages communicated over an in-vehicle network; receiving a message sent from, or sent to, at least one of the plurality of ECUs; determining, based on the model, whether or not a behavior or, the received message, meets a criteria or complies with an expected timing, content, or other expected value or attribute; and, if the message does not comply with an expected value or does not meet a criteria, then performing at least one action related to the message, related to the in-vehicle network and/or related to the at least one ECU. For example, an action performed by controller 105 may be or may include, logging or recording an event (e.g., for further or future investigation or analysis), removing a message from a communication bus, modifying a message and/or changing a configuration of an in-vehicle network or of at least one of the ECUs connected to the in-vehicle network.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or tasks or enabling software programs or other modules or units to communicate. Operating system 115 may be a commercial operating system. It will be noted that an operating system 115 may be an optional component, e.g., in some embodiments, a system may include a computing device that does not require or include an operating system 115. For example, an SEU may be, or may include, a microcontroller, an application specific circuit (ASIC), a field programmable array (FPGA) and/or system on a chip (SOC) that may be used (e.g., as, or included in, an SEU) without an operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that enforces security in a vehicle as further described herein. Although, for the sake of clarity, a single item of executable code 125 is shown in FIG. 1A, a system according to some embodiments of the invention may include a plurality of executable code segments similar to executable code 125 that may be loaded into memory 120 and cause controller 105 to carry out methods described herein.

Storage system 130 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1A may be omitted. For example, memory 120 may be a non-volatile memory having the storage capacity of storage system 130. Accordingly, although shown as a separate component, storage system 130 may be embedded or included in memory 120. Model 136 may be, or may include, a timing model that includes timing properties of messages, or expected behavior of messages, as described herein. As further described, model 136 may be, or may include, a content model that may include content attributes or properties of messages, or expected content related behavior of messages, as described herein. Storage system 130 may be a long term storage system, e.g., a disk or hard drive.

Input devices 135 may be or may include any suitable input devices, components or systems, e.g., a detachable keyboard or keypad, a mouse and the like. Output devices 140 may include one or more (possibly detachable) displays or monitors, speakers and/or any other suitable output devices. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140. It will be recognized that any suitable number of input devices 135 and output device 140 may be operatively connected to computing device 100 as shown by blocks 135 and 140. For example, input devices 135 and output devices 140 may be used by a technician or engineer in order to connect to an SEU (that may be or may include computing device 100), download data from an SEU, read, or be presented with, data of the SEU, configure the SEU, update software and the like. Input devices or components 135 and 140 may be adapted to interface or communicate, with control or other units in a vehicle, e.g., input devices or components 135 and 140 may include ports that enable computing device 100 to communicate with an engine control unit, a suspension control unit, a traction control and the like.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a plurality of components that include a respective plurality of central processing units, e.g., a plurality of SEUs as described, a plurality of SEUs embedded in an on board, or in-vehicle, system or network, a plurality of chips, FPGAs or SOCs, a plurality of computer or network devices, or any other suitable computing device. For example, a system as described herein may include one or more devices such as computing device 100.

An embodiment may include or use one or more computing devices in order to detect or identify security threats, detect or identify events or states that may jeopardize the security, or proper function, of a vehicle and/or an in-vehicle network and nodes attached thereto. In some embodiments and as described, one or more computing devices (e.g., computing devices similar to computing device 100) may be used or deployed in order to enforce security or correct functioning in an on board, or in-vehicle, network. It will be understood that enforcing security as referred to herein may include enforcing any security related measures or aspects, e.g., enforcing security in an in-vehicle network may include identifying threats, logging or recording events that may be related to threats or malicious activity, alerting, blocking messages, disabling or enabling components in a network and so on.

The terms "message" and "messages" as referred to and used herein may relate to any data unit communicated over a network. For example, a message may be an individual, or single data package, signal or frame as known in the art or a message may be a group or set of data units, packages or frames. Generally, signals as referred to herein may be data sent by a control or other unit. Signal values, as referred to herein, may be values sent by a control or other unit. For example, a unit or component that monitors and/or controls oil pressure in an engine may send signals that may be messages that include values representing engine oil pressure. A message as referred to herein may be one data unit or a group of data units that are sent to, or from, a specific node on a network, a message may be one data unit or a group of data units, packages or frames with a common identifier, or identity (both abbreviated "ID"), similar or same payload, sent or used for a common purpose and the like. When used herein, a message may refer to the general description or type for a group of messages, each with an individual specific instantiation of that message. E.g. a message having message ID XYZ may be used to refer to a type of message having that specific ID, and any individual message within that type.

Reference is made to FIG. 1B which schematically shows a vehicle and components of a system according to illustrative embodiments of the present invention. FIG. 1B schematically shows a vehicle 30 that includes an in-vehicle CAN 61. As shown, CAN 61 may include hardware communication buses 61 and 71. It will be understood that CAN 61 may include any number or types of hardware buses, e.g., in addition to hardware buses 61 and 71. As further shown, a plurality of SEUs 40 may be connected to CAN 61. SEUs 40 may operate to monitor communications over CAN 61, may detect anomalous messages and may perform actions with respect to anomalous messages.

SEUs 40 may monitor communications traffic over portions of CAN 61 to which they are connected to detect anomalous messages that propagate over the network and, optionally undertake actions to provide and maintain integrity and/or security of the network in the face of malfunctions, errors, and/or cyber-attacks. Although CAN is mainly referred to herein, it will be understood that any type of in-vehicle communication network may be used and that the scope of the invention is not limited by the type of the in-vehicle communication network used.

CAN 61 may include, for example, a high-speed CAN bus 61 and a medium-speed CAN bus 71 to which various components of vehicle 30 may be connected as nodes. The term "node" (or "network node") as used and referred to herein may relate, or refer to, any component connected to an in-vehicle network, e.g., a node as referred to herein may be any unit, device or system connected to an in-vehicle network and adapted to receive and/or transmit data or messages over the in-vehicle network.

An SEU 40, in accordance with an embodiment of the disclosure, may be connected to high-speed CAN bus 61 and to medium-speed CAN bus 71. Data may be transmitted between nodes connected to buses 61 and 71 using CAN frames as known in the art, which may be referred to herein as CAN packets, or CAN messages.

A CAN message in one example includes an 11 bit, or 29 bit extended, arbitration ID that may be used to identify the CAN message, a CAN message data field including a plurality of data bytes referred to as signals, and a cyclic redundancy check (CRC) code used for verifying an integrity of a message as known in the art. Other formats for a CAN message may be used. A CAN message arbitration ID may hereinafter be referred to as a CAN message ID or simply message ID. Typically, a given CAN message may be associated with at least one frequency of transmission that defines a corresponding expected repetition period (e.g. behavior) with which the given CAN message is usually transmitted or retransmitted over the CAN network. A specific CAN message, e.g., identified by its specific (possibly unique) CAN message ID, may be associated with more than one expected repetition periods. At any given time, the selection or identification of which of the more than one repetition periods associated with (or characterizing) a transmission of a given CAN message over a CAN network may be a function of, or based on, a context at the given time. The terms "vehicle context", "network context", "nodes context" or simply "context" as referred to herein may relate to a state, configuration or any operational or functional aspects of one or more of: a vehicle, an in-vehicle network, and/or one or more nodes connected to the in-vehicle network. Context and repetition period are further described herein below.

Although CAN messages and signals are mainly referred to herein, it will be understood that any types of messages and signals may be applicable and that the scope of the invention is not limited by the type or messages, signals or protocols used. For example, in some embodiments, an in-vehicle network, messages and/or signals may be according to, or as defined by, the Autostar standard known in the art, e.g., signals as referred to herein may be protocol data units (PDUs) as defined by the Autostar standard.

A repetition period of, or associated with, a message may be a periodicity or a time interval. For example, based on a specification of a manufacturer of a node or based on monitoring or learning a pattern of messages sent by a node, the time interval between messages (e.g., messages that include the same message ID) sent by a node may be known and may be stored in a storage system (e.g., in model 136 on storage system 130 operatively connected to SEU 40) such that SEU 40 may determine whether or not a sequence of messages sent from the node deviates from a known or expected repetition period by comparing an interval between messages to an interval stored as described.

Anomalous messages and/or messages related to an anomaly as referred to herein may be messages that are (or were) transmitted according to a timing value or parameter that deviates from an expected timing or content value or parameter. Anomalous messages and/or messages related to an anomaly as referred to herein may be messages that include content (or signal) that is different from an expected content or signal. Detecting or identifying anomalous messages and/or messages related to an anomaly may be according to a context as described. For example, and as further described herein, an embodiment of the invention may identify an anomaly by determining a context and comparing or relating timing values and/or content of one or more messages to expected timing values and content, e.g., expected for a specific context.

An anomaly as referred to herein may be any deviation from an expected behavior, result, sequence or event. For example, any of: an unexpected value in a message; an unexpected message or sequence of messages; an unexpected event; an unexpected content or timing of, or related to, a message may be an anomaly and/or may be identified, detected and/or determined as an anomaly by an embodiment. For example, expected values, messages, events, content and timing may be defined, included or represented in a model and, accordingly, an embodiment may identify unexpected timing, content or behavior by comparing attributes of messages to data in a model and thus determine, detect or identify an anomaly.

Determining, detecting or identifying an anomaly may include determining a message does not comply with a model as described herein. Accordingly, determining a message is anomalous or is related to an anomaly may include, or be based on, determining the message does not comply with a model. In some embodiments, determining a message is anomalous and/or is related to an anomaly may be based on considerations, calculations or logic other, or additional to, considerations, calculations or logic related to model.

Context, vehicle context or context of a vehicle (e.g., context of vehicle 30) as referred to herein may relate to a state of the vehicle, a state of the vehicle's in-vehicle communication network (e.g., a state of CAN 61) and/or a state of nodes connected to an in-vehicle communication network. For example, a state or context of vehicle 30 may be defined (and determined by an SEU 40) responsive to a value for each of at least one parameter, which one or more sensors or nodes in the vehicle provides, for example in a data portion of a CAN message that it transmits. The at least one parameter may for example, include one, or any combination of more than one of, vehicle's speed, acceleration, closing speed to a leading or trailing vehicle, engine revolutions per minute (rpm), engine temperature, oil pressure, hydraulic pressure, wheel traction, road condition, vehicle location optionally provided by a GPS signal, and/or weather condition. State or context of an in-vehicle network (e.g., of CAN 61), may by way of example, be defined (e.g., by an SEU 40) responsive to baud rate, which types of messages are being transmitted over the network, and/or which nodes in in-vehicle communication network (e.g., in CAN 61) are actively communicating over the network. State of in-vehicle communication network may also include a state or contents of a communication session of which the CAN message is a part.

A context or state of a node may be, for example, an operational stage or phase, e.g., the node is rebooting, the node is in an initialization sage, the node is restarting and so on. A context or state of a node may be related to an error that occurred at the node or network or any other aspect related to the functioning of the node or network. Accordingly, an SEU 40 may determine, detect or identify a context based on at least one of: a state or other attribute of a vehicle, an in-vehicle network, and a node connected to the network.

For example, by examining messages communicated over an in-vehicle network (and, as described, an SEU 40 may receive any of, or even all, messages sent over an in-vehicle network) an SEU 40 may know, or determine or identify, the state of the vehicle itself, nodes on the in-vehicle network as well as the state or context of any one of the nodes connected to an in-vehicle network.

SEU 40 may receive data from components in vehicle 30 and calculate, determine or deduce a context, possibly based on more than one input from more than one component. For example, a first context may be determined by SEU 40 if the speed of the vehicle is 40 mph and the rpm is 1,500 and a second, different context may be determined by SEU 40 if the speed of the vehicle is 10 mph and the rpm is 1,500. A context may be determined, by SEU 40, based on a lookup table as known in the art, e.g., a table that associates a set of states of, or signals received from one or more of: of a vehicle, an in-vehicle network and nodes on the in-vehicle network with a state. Accordingly, any set of states and/or set of conditions and/or set of signals received may be translated, or used for determining a context as described.

A model, e.g., a timing or content model used by an SEU 40 for detecting anomalies as described, may be, or may include, any content, data or information related to messages. Specifically, a timing model may be, or may include any data or values related to timing aspects of messages or signals communicated over a network. For example, a model may be a file or a memory segment or any other object or construct that includes, possibly for each message type or message ID in a set of message types or IDs, an indication of expected or normal time interval between messages, number of expected messages per second (or other time unit, period or resolution) a repetition period (e.g., the number of times a message is repeated, transmitted or retransmitted over a network), a periodicity of a message or any other timing properties or time related aspects or attributes of a message. A model (e.g., a timing model) may be, may include, or may be used in order to determine, an expected behavior. Accordingly, a model that represents, or models, a behavior, e.g., a timing or content related behavior, may be referred to herein as a behavioral model, e.g., a model related to a timing or content behavior may be referred to herein as a behavioral timing model and/or behavioral content model.

For example, an expected behavior of a specific message (or message ID), expressed in words may be: "no more than 7 messages per second" and "no less than 3 messages per second" and "interval between messages in no more than 150 ms" and "interval between messages is no less than 50 ms". For example, the exemplary behavior (or expected behavior) of a message ID provided in words above may be defined, or included in, a timing model using a set of values in an entry of, or for, the message ID, e.g., entries as shown in table 580 and described in related text. An expected behavior of a message may refer to the behavior of a group of messages having a common message type, message ID, description, etc.

A deviation from an expected repetition period or from a model may be regarded by an embodiment as an indication for an anomaly. A deviation from an expected repetition period may be identified or detected, e.g., by an SEU 40, by comparing a repetition period, a time interval between messages or other timing aspects measured for messages to data in a model. For example, in order to determine whether or not at least one of first and a second messages is related to an anomaly, an SEU 40 may compare the time between the two messages (e.g., the time difference between receiving, by the SEU 40, the first message and the second message) to a time interval in a model. As further described herein, a model may include thresholds (e.g., a maximal deviation from a normal or expected time interval) and contexts that may be used, e.g., by an SEU 40, to determine anomalies. Accordingly, an embodiment may determine whether or not at least one message included in a plurality of messages is related to an anomaly.

For example, a node in an in-vehicle may typically transmit a messages according to a relatively constant time interval (e.g., once every second or 100 ms). At specific times or under specific conditions, the node may deviate from its regular, constant or normal interval. The time intervals between messages sent by a node may be known to, or determined by, an embodiment and may be recorded, or included in, a timing or other model such that they may be used in order to determine, detect or identify anomalies as described.

For example, using a specification of a network or a node, SEU 40 may be configured such that it knows, or is able to determine, for at least some of the message IDs communicated over an in-vehicle network, the expected time interval between consecutive messages or the periodicity of messages. For example, some nodes on an in-vehicle may be configured or designed to periodically, according to a fixed or constant interval, send messages and the fixed or constant intervals or periods may be recorded, indicated, or included, in a timing or other model.

Based on a specification of such nodes, the periodicity (and content) of their messages may be known and recorded (e.g., in a timing and/or content model such as model 136 in storage system 130, that may be accessible to an SEU as described). For example, a user may store, in model 136, the time intervals for a set of message IDs. In some embodiments, rather than, or in addition to, storing an actual or known interval or periodicity of messages, a threshold interval or periodicity threshold may be calculated and stored in a model. For example, a threshold may be calculated, e.g., by an SEU, based on a specification, e.g., if the interval as indicated by a manufacturer (and stored in model 136) of a node is 100 ms, a threshold may be set or defined, e.g., by an SEU, by reducing the indicated interval by 10%, e.g., a threshold may be set to 90 ms if the indicated periodicity or interval is 100 ms. As described, various ways, systems and/or methods may be used to create and/or update a model. For example, a technician may create or update a model as described. In other cases, a model (or an initial basic model) may be stored in a system by a manufacturer of a vehicle. In some embodiments, a model may be created and/or updated by an embodiment of the invention. For example, by monitoring and examining messages communicated over an in-vehicle network and recording related timing aspects (e.g., intervals between messages), an SEU may create a model and dynamically, repeatedly and/or continuously update a model. For example, based on continuously and/or repeatedly monitoring, measuring, calculating or determining timing aspects such as time intervals between messages, number of messages per time unit and the like, an SEU may dynamically, repeatedly and/or continuously update threshold values or other criteria in a model used as described herein. It will be understood that an SEU may dynamically, repeatedly and/or continuously update a model by modifying or updating any data included in a model as described herein.

For example, an SEU may determine an average time interval between messages with a specific ID and include or store, in model 136, an entry that indicates the expected time interval for the specific ID as well as any other data, values or information related to the ID as described herein. Based on monitoring and examining messages as described, an SEU may calculate or determine thresholds (e.g., as described) and update a model based on the thresholds. In some embodiments, thresholds as described herein may be defined, calculated or set using any system or method. For example, using input devices 135 and/or output devices 145, a technician may connect a computer to a system and download thresholds, specifications of nodes or any other data into a timing model, e.g., model 136 in storage 130.

In some embodiments, SEU 40 may, e.g., during a learning phase or stage, record the periodicity of, or time intervals between, messages with the same message ID, determine a normal, average or expected periodicity or time interval for the message ID, e.g., by calculating an average periodicity or time interval and SEU 40 may record, or store, in a timing or other model, the normal or expected periodicity or time interval in association with the message (e.g., in model 136 in storage system 130). In some embodiments, periodicity of, or time intervals between, messages may be known (and stored in model 136 in storage system 130) based on a configuration of a system. For example, based on a specification (e.g., a data sheet) provided by a manufacturer of a node or of a vehicle, the message ID and intervals between messages sent by the node may be known and included in a timing model. A specification from a manufacturer may list a set of intervals and/or a set of message IDs sent by a node, e.g., during a respective set of operational states of the node. Any information provided by a manufacturer of a node may be stored (e.g., in a timing model as described) and/or used for calculating thresholds as described and may be used in order to evaluate and/or determine context and timing aspects as described herein. While in one example the periodicity between messages having the same message ID is analyzed, the periodicity or interval between messages having other characteristics in common may be analyzed, e.g., messages from the same source, messages carrying the same payload or data, messages including repeated type of information, etc. Messages other than CAN messages may be used.

SEU 40 may use a recorded, or stored, normal or expected periodicity of a message ID (e.g., included in a model as described) in order to identify an anomaly. For example, SEU 40 may measure or otherwise determine a time interval between two messages (or a plurality of more than two messages) that include a specific (and same) message ID, compare the measured time to a time interval stored or recorded in a model as described, and, if the measured time interval is greater, or is less, than the time interval in a model, SEU 40 may determine at least one of the two messages is related to an anomaly. For example, two thresholds may be calculated, included in a model, and used as described, e.g., a first threshold for determining whether or not a time interval between two messages is too short and a second threshold for determining whether or not a time interval between two messages is too long. For example, if it is known (e.g., based on a specification of a manufacturer or based on recording intervals between messages during a learning phase, all of which may be included in a model) that the expected time interval between messages with a specific message ID is 100 ms then the first threshold may be set to 90 ms and the second threshold may be set to 110 ms and the thresholds may be included in a timing model and used, e.g., by an SEU 40, in order to evaluate time intervals between messages as described. Calculating and recording or storing thresholds, e.g., in a model as described, may be done by an SEU 40 that may be configured to examine data (e.g., model 136 stored in storage system 130), identify time intervals (e.g., stored in a predefined or known format and/or in predefined files or folders in a timing or other model such as model 136 in storage system 130), and calculate and store thresholds as described. Accordingly, a process of creating and/or updating a timing model and/or setting, defining and storing thresholds in a model may be fully automated by an embodiment of the invention.

It will be understood that, although examples described herein refer, for the sake of simplicity and clarity, to two or three messages, embodiments of the invention may monitor time lapses related to any (possibly large) number of messages, calculate an average time lapse for an ID value or for any number of messages that include the same ID value, and embodiments of the invention may determine whether or not at least one message included in a plurality, or any number of messages, is related to an anomaly, may determine whether or not at least one message included in a plurality or any number of messages complies with a model, and may, e.g., based on relating an average time lapse to a threshold included in a model, determine whether or not at least one message included in a plurality of messages is related to an anomaly. The terms "time interval", "time lapse" and "time difference" as referred to herein may relate to the same thing and may be used herein interchangeably. "Time interval", "time lapse" and "time difference" may be, e.g. the amount or period of time between the sending or reception of two different messages.

Associating or linking a message or an identifier of a message (e.g., a CAN message or a message ID) with a repetition period, a recurrence, a periodicity and/or with a time interval (e.g., an expected or normal time interval as described) may include inserting, e.g., into a table or list, an entry that includes the message ID (or other descriptor of the message) and a set of time intervals, repetition values and/or other data such that using the message ID, the repetition period or other timing values or parameters may be readily and quickly retrieved or obtained. Associating or linking a message or message ID with a repetition period, a recurrence, a periodicity and/or with a time interval may include any method, construct or system that using a message ID in order to obtain a repetition period, a recurrence, a periodicity a time interval and/or any timing parameter or value related to the message ID. Messages may be identified by identifiers other than message ID, for example source of message, type of data in message, etc. Similarly, a message ID may be associated with a content (e.g., an expected content, value or signal) by inserting, e.g., into a table or list, an entry that includes the message ID (or other descriptor of the message) and a value, signal or expected content.

An association of a message with a repetition period (or with content as described) may include a context. For example, table or list may include, for a specific message ID, a content or value, a set of time intervals and a respective set of contexts. For example, some of the time intervals in a table or list may be linked or associated with a message ID as described and with context such that when a message ID and a context are known, the time interval for, or that is relevant to, the message ID and the context is retrieved from the table or list. Any other constructs, systems or methods may be used in order to associate a time interval, repetition period or other timing values and a context with a message ID, e.g., linked lists or other objects or methods, e.g., as used by databases as known in the art.

In order to allow for some degree of "normal" deviations from an expected timing, more than one deviation or message which deviates from a time interval may be required in order for messages to be considered anomalous. The parameters describing the expected period and/or how many deviations may still be considered normal may be extracted by processing the network's specifications, nodes specifications and/or by processing characteristics of the network traffic during normal operation of the network.

In some embodiments, two thresholds may be used in order to determine if one or more messages indicate, or are related to, an anomaly. For example, an SEU 40 may determine that at least one of two messages is related to an anomaly if the time interval between the two messages is greater than a first threshold, or is less than a second threshold. A threshold may be related to the number of too small or too large intervals. A threshold may be related to the number of violations, e.g., the number of (possibly consecutive) occurrences of time intervals that are not as expected. For example, an SEU 40 may determine messages are related to an anomaly if a set, or sequence of, time intervals between messages are all less than, or all greater than, a threshold. For example, a number threshold may be three ("3") and SEU 40 may determine messages are related to an anomaly if three intervals between four consecutive messages are all too short or too long (e.g., below a threshold related to intervals). Accordingly, in some embodiments, first and second thresholds may be related to the time interval between messages and a third threshold may be related to the number of times the first or second threshold were breached.

Figure 1C:
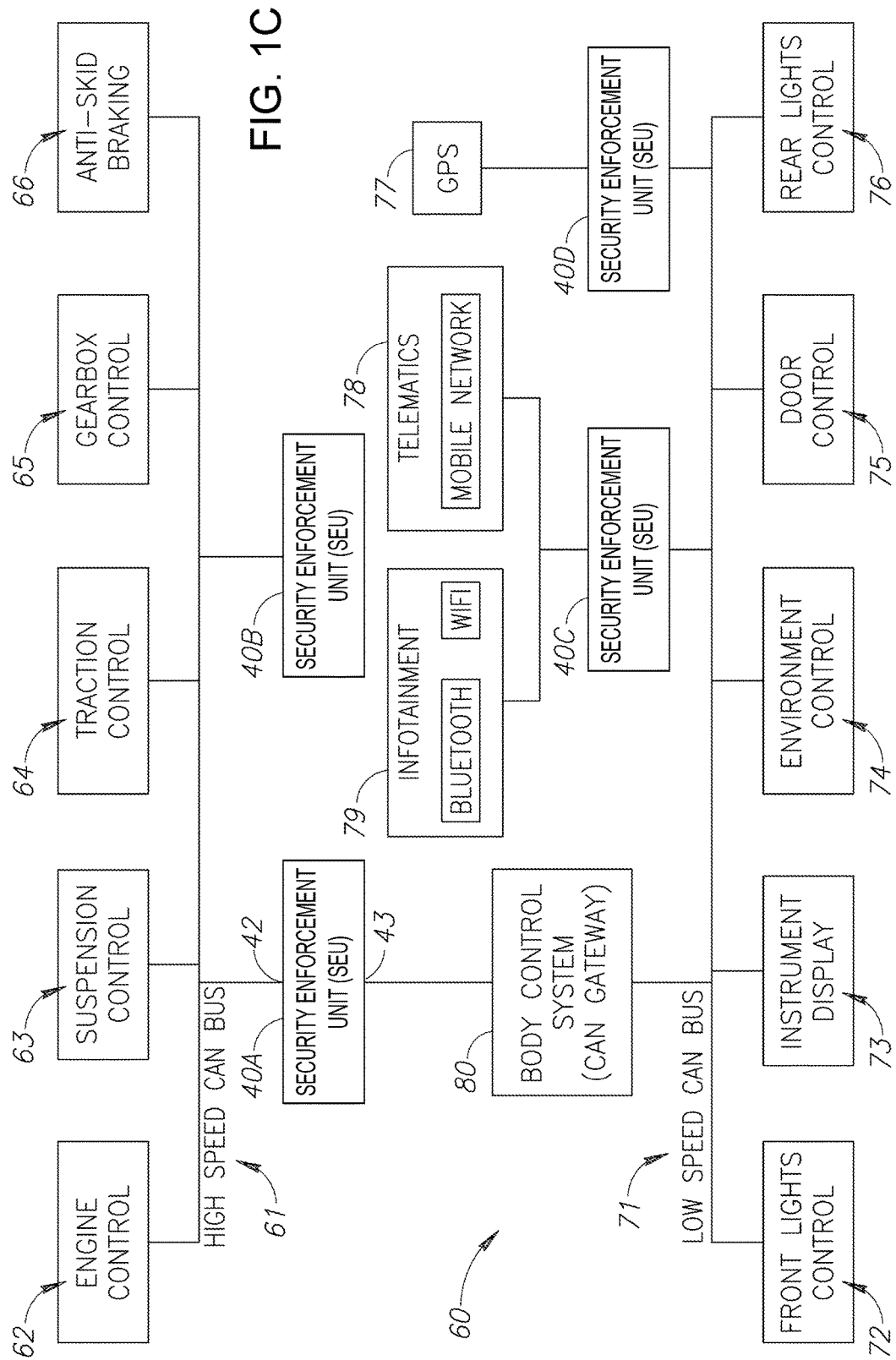
FIG. 1C shows a schematic block diagram of components of a system according to illustrative embodiments of the present invention.

Reference is made to FIG. 1C that shows a schematic block diagram of components of a system 60 according to illustrative embodiments of the present invention. As shown, system 60 may include an in-vehicle CAN 61 communication network analyzed or protected by a set of SEUs (e.g., SEU similar to SEUs 40), in accordance embodiments of the present invention. FIG. 1C shows a schematic block diagram of portions of an in-vehicle communication network that may be CAN 61 and CAN 71. As shown, an in-vehicle communication network that may include two portions (e.g., CAN 61 and CAN 71) may be protected by a set of SEUs 40A, 40B, 40C and 40D that may protect the network and specific control systems included in vehicle 30. While in one embodiment SEUs are shown analyzing a network, other units may be used, for example in different contexts.

The control systems and/or their respective components may be connected to, for example, high-speed and medium-speed CAN buses (or other bus bars or systems as known in the art) 61 and 71. For example, medium-speed CAN bus 71 may be a class B CAN bus that operates at data transmission speeds of up to 125 kilobits per second (Kbps), to support communications between nodes, such as components of vehicle body control systems and infotainment systems that can function properly receiving and transmitting data at relatively low data transmission rates. By way of example, medium-speed CAN bus 71 is schematically shown connected to nodes that are, as shown, headlights 72, instrument display 73, environment control 74, door control 75 and rear light control 76.

An infotainment system 79 including Bluetooth and Wifi communication interfaces and a telematics system 78 that provides a communication interface to mobile phone networks and supports hands free calling may be connected, as shown, to medium-speed CAN bus 71 via SEU 40C discussed below. A GPS receiver 77 may optionally be separated from telematics system 78, and may be connected to medium-speed CAN bus 71 via SEU 40D as shown.

High-speed CAN bus 61 may be a class C CAN bus that operates at data transmission speeds of up to 1 megabits (MB) per second to support communications between nodes such as sensors and ECUs of various control systems that may require relatively high-speed transmission of data between the nodes to operate properly. High-speed CAN bus 61 is schematically shown connected to engine control 62, suspension control 63, traction control 64, gearbox control 65, and braking control (anti-skid braking) control 66. As shown, high-speed CAN bus 61 may be connected by a body control system (CAN gateway) 80 to medium-speed CAN bus 71. Each of SEUs 40A, 40B, 40Ca and 40D may include, or be connected to, one or more ports for receiving and transmitting data from/to busses it is connected to. For example, and as shown, SEU 40A may include ports 42 and 43 enabling SEU 40A to communicate over CAN bus 61 (using port 42) and over CAN bus 71 (e.g., using port 43 to communicate with CAN bus 71 via CAN gateway 80.

In some embodiments, an in-vehicle network (e.g., a network including CAN 61, CAN 71 and nodes as described and shown, e.g., in FIG. 1C) may be monitored and/or protected by a set or plurality of, SEUs 40, e.g., SEUs 40A, 40B, 40C, and 40D as shown. It will be understood that any number of SEUs 40 may be included in a system.

In some embodiments or in an exemplary configuration, and as shown by FIG. 1C, SEU 40A may be a two communication port module connected between high-speed bus CAN 61 and CAN gateway 80 that connects the high-speed bus CAN 61 to medium-speed bus CAN 71. SEU 40B may be a single communication port module connected to high-speed bus CAN 61. Infotainment system 79 and telematics system 78 may be connected, via SEU 40C, to medium-speed bus 71 and GPS receiver 77 may be connected via SEU 40D to medium-speed bus 71. SEU 40A may operate in accordance with an embodiment of the invention to monitor CAN messages that are transmitted between high-speed bus CAN 61 and CAN gateway 80 and to detect anomalous messages that are transmitted to pass through CAN gateway 80 from one to the other of buses CAN 61 and CAN 71. SDU 40B may be connected to high-speed CAN bus 61 to eavesdrop on communications over the high-speed bus and to monitor and detect anomalous messages propagating in the high speed bus. SEUs 40C and 40D may be configured, or may operate, to monitor and detect anomalous messages that attempt to enter in-vehicle communication network 60 via external interface units, devices, systems or modules, e.g., via Bluetooth, WiFi, and/or mobile telephone communication interfaces.

An SEU 40 may, in response to detecting an anomalous message, operate to undertake any of various response actions to protect system 60 (or the network and components therein) from possible damage by the anomalous message. Response actions may, by way of example, include: blocking the message, delaying the message; limiting the frequency of the message, logging the message into a memory included in an SEU 40; and/or raising an alert responsive to the message. A response action or actions may optionally be dependent on a level of confidence the SEU 40 may attribute to the detected anomaly. For example, anomalies detected with a relatively high degree of confidence may cause an embodiment to block messages as described herein or to isolate a component for an in-vehicle network, while anomalies detected with a relatively low degree of confidence may only be logged. The level of confidence may be dependent on a combination of optionally more than one factor such as the type of message, its ID, the type of the anomaly detection method used and detection specific parameters for the anomaly such as timing information for the message. An SEU 40 in accordance with an embodiment of the invention is not limited to a number of communication ports shown in FIG. 1C and may have a number of communication ports different from the numbers shown in FIG. 1C, e.g., an SEU 40 connected to five portions of an in-vehicle network may include five communication ports that may be similar to ports 42 and 43.

Although in FIGS. 1B and 1C SEU 40 devices, units or modules are schematically shown as separate components that appear to be hardware components, an SEU 40 in accordance with an embodiment of the invention may be a "virtualized SEU" defined by a software component included in a node on, or connected to, an in-vehicle communication network (e.g., a node on CAN 61). For example, CAN gateway 80 may be, or may include components of, computing device 100, e.g., include computer executable instructions and data (e.g., executable code 125 and memory 120), or CAN gateway 80 may include a combination of software and hardware that provide SEU 40 functionalities in accordance with an embodiment of the invention. In some embodiments, an SEU 40 may also be integrated into the hardware of a node, e.g., in the hardware of telematics unit 78. It will be understood that any component, unit, system or device connected to an in-vehicle network and including at least a controller (e.g., a controller 105), a memory (e.g., a memory 120) and computer instructions (e.g. executable code 125) may be used as, or may include, an SEU 40 as described herein.

Figure 2:
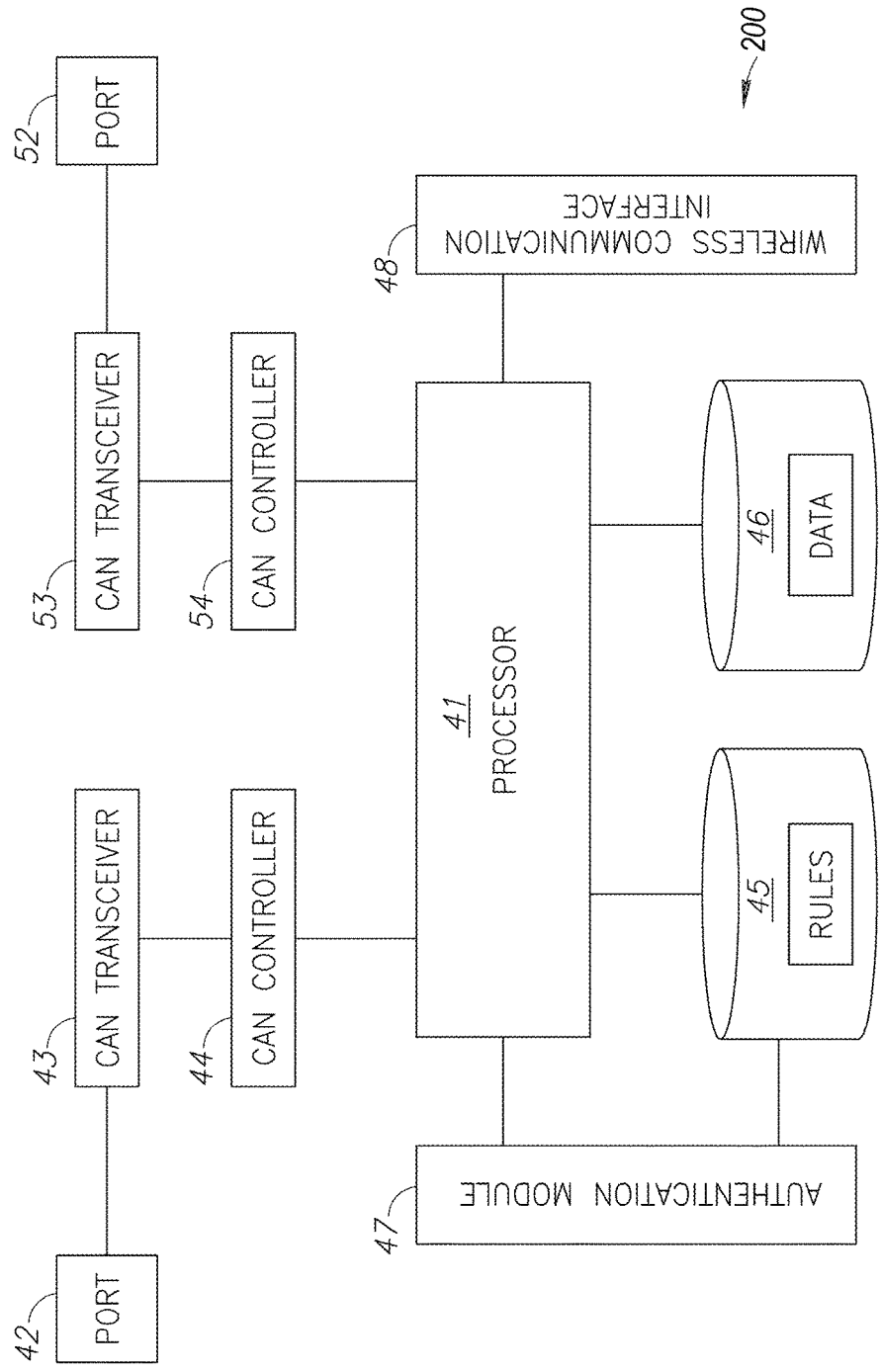
FIG. 2 shows a schematic block diagram of components of a system according to illustrative embodiments of the present invention.

Reference is made to FIG. 2 that shows a schematic block diagram of components of a system 200 according to illustrative embodiments of the present invention. More specifically, FIG. 2 shows components that may be included in an SEU according to some embodiments of the invention. For example, SEUs 40A, 40B, 40C and 40D described herein may be, may include, or may be similar to, system 200. It will be understood that various embodiments or configurations may be contemplated, e.g., an SEU in some embodiments may include components not shown in FIG. 2, an SEU according to other embodiments may include only a sub-set of the components shown in FIG. 2 and/or, in some embodiments, an SEU may include two or more similar components, e.g., an SEU may include two or more wireless communication interfaces (e.g., as shown by block 48 and further described herein).

As shown, system 200 (e.g., an SEU) may include a processor 41 and a number of communication ports, e.g., communication ports 42 and 52 as shown. Communication ports such as communication ports 42 and 52 may be used for, or adapted to, transmitting messages to and receiving messages from a CAN bus or a CAN node to which the SEU is connected. For example, in FIG. 1C communication port 42 of SEU 40A is connected to high-speed bus CAN 61 and port 52 of the SEU is connected to CAN gateway 80. As shown, port 42 may be connected to processor 41 by a CAN transceiver 43 and a CAN controller 44. Transceiver 43 may convert bits in a CAN message, which may be serially received from high-speed bus CAN 61 at port 42, from a CAN format to a format used by the SEU and forwards the bits to CAN controller 44. CAN controller 44, which may be embedded into the processor 41, may store the bits until all the bits in, or of, a CAN message to which the bits belong are received, and the complete message is assembled. CAN controller 44 may forward an assembled message to processor 41 for processing in accordance with an embodiment of the invention. CAN controller 44 may receive bits generated by processor 41 for transmission from an SEU to high-speed CAN bus 61 in a CAN message, and may forward the bits to transceiver 43 for conversion from an SEU format in which the bits are generated to a CAN format. Transceiver 43 may forward the bits in the CAN format for transmission to CAN bus 61 via port 42.

Port 52 may be connected to processor 41 by a transceiver 53 and controller 54 and may operate to transmit CAN messages to and from CAN gateway 80. Processor 41 may include any processing and/or control circuitry known in the art and may, by way of example, include any one or any combination of more than one of a microprocessor, an ASIC, FPGA and/or s SOC.

As shown by FIG. 2, an SEU may include an authentication module 47 for authenticating messages the SEU receives and a wireless communication interface 48 for communicating with entities outside of, or external to, an in-vehicle communication network (e.g., external to CAN 61) via a wireless communication channel. For example, wireless interface 48 may provide connectivity to a WiFi network, and/or a Bluetooth channel and/or a mobile phone network such as a 3G network. In some embodiments, e.g., in the absence of such a wireless capability, an SEU in accordance with an embodiment of the disclosure may communicate with an outside or external entity over an existing vehicle connection to the cloud. This may be performed by tunneling via a CAN bus, such as CAN bus 71 or 61 to an ECU in the in-vehicle network that may have connectivity to the cloud. For example, tunneling may be implemented by reading and writing PIDs according to the Unified Diagnostic System Standard or by using any other protocol supported by the CAN bus.

Processor 41 may process a message it receives via port 42 or port 52 in accordance with computer executable instructions stored in a memory 45 and data optionally stored in a data memory 46 to determine whether or not a message is an anomalous message (or is related to an anomaly) and optionally in accordance with a vehicle context during which the message is received. The vehicle context may be determined by an SEU responsive to data included in messages that SEU receives and which the SEU may store as data in memory 46. Memory 45 and/or memory 46 may include primary and/or secondary memory used by an SEU and although memories 45 and 46 are schematically shown as separate units, these memories may be included in a same unit and/or may be embedded into processor 41.

In some embodiments, memory 46 may include a database that includes data for a number or set (denoted herein as "N") of CAN messages that may be propagated over an in-vehicle network. For each CAN message in the database, memory 46 may include a message ID, at least one expected repetition period (or periodicity or a time interval as described), and a plurality of time lapse bins or other constructs, ranges or storage structures that may be used to determine whether a message having the message ID is an anomalous message. A database or model may include a context for at least some of the time lapse bins, periodicities or time intervals such that a time lapse bin, periodicity or a time interval used for determining whether or not a message is related to an anomaly is selected based on a context. Data constructs other than bins may be used.

Reference is made to FIG. 3A which schematically shows a timing diagram according to illustrative embodiments of the present invention. In particular, FIG. 3A graphically exemplifies timing aspects related to determining whether or not a CAN message characterized by repetition period is related to an anomaly or is an anomalous message, in accordance with some embodiments of the invention.

By way of example, FIG. 3A shows a schematic timing diagram 400 that illustrates temporal relationships between a repetition period and time lapse bins for an "n-th" CAN message included in a set of N CAN messages. For example, the n-th CAN message may be the third message in a set or sequence of fine CAN messages. The n-th message may be identified by a message ID (IDn), and may be represented as MSG(IDn) or MSGn, where $1 \leq n \leq N$. The n-th CAN message may be associated with M different expected repetition periods denoted as T(IDn,m) where $1 \leq m \leq Mn$. Each repetition period T(IDn,m) may be associated with at least two time lapse bins. Different messages MSGn may be associated with a different number Mn of different expected repetition periods.

Reference is made to FIG. 3A which schematically shows a timing diagram according to illustrative embodiments of the present invention. FIG. 3B graphically exemplifies timing aspects related to determining whether or not a CAN message characterized by repetition period is related to an anomaly or is an anomalous message, in accordance with some embodiments of the invention. More specifically, FIG. 3B shows a timing diagram for determining whether or not a CAN message characterized by a plurality of different repetition periods is an anomalous message and/or is related to an anomaly in accordance with some embodiments of the invention.

In FIG. 3A, a MSG(IDn) is schematically shown as a vertical "baton icon" labeled MSG(IDn) transmitted at a time Tj along a time line 402. Time Tj follows transmission of a previous message MSG(IDn) at a time Tj−1 by expected repetition time T(IDn,m). Repetition period T(IDn,m) may be assumed, by way of example, to be associated with only two temporally sequential time lapse bins, σ−n,m and σ+n, m. The size or width of σ−n,m and σ+n,m may be set, determined or defined based on the relevant T(IDn,m). For example, in some embodiments the σ−n,m bin width or size is set to be 0.75T(IDn,m), in other embodiments, the σ−n,m bin width or size is set to be 0.9T(IDn,m). A bin or time lapse bin as referred to herein may generally relate to a time difference, time period, time interval, time window or any other time unit. For example, a bin or time bin may be a length of time between messages.

In some embodiments, a sum of the durations of time lapse bins σ−n,m and σ+n,m is set, determined, or defined such that it is substantially equal to repetition period T(IDn, m) and relative to T(IDn,m) time lapse bins σ+n,m are shifted to later times by a relatively small time interval δ+n,m. Bin widths of time lapse bins σ−n,m and σ+n,m may be varied to accommodate changes in the state of vehicle 30, and/or the state of an in-vehicle communication network (e.g., a state of CAN 61).

If a first message is transmitted at time tj−1 and a second message (with the same message ID) is transmitted at time tj then, in some embodiments, if the time lapse Δtj,j−1 calculated by Δtj,j−1=tj−tj−1 falls in time lapse bin σ+n,m, then MSG(IDn) transmitted at time tj may be considered to be anomalous. If Δtj,j−1 falls in time lapse bin σ+n,m, then, in some embodiments, the message may be considered to be non-anomalous.

In an embodiment bin width of time lapse bin σ−n,m may be associated with a maximum anomaly count CM×σ−n,m. If a number of, optionally consecutive, times tj for which Δtj,j−1 falls in σ−n,m is equal to CM×σ−n,m the transmission of MSG(IDn) may be considered, by some embodiments, to indicate a degree of anomaly that warrants a response by an SEU 40. Although in some embodiments and as described, Δtj,j−1 falling in time lapse bin σ+n,m may be an indication that MSG(IDn) is not anomalous, in some embodiments or cases, e.g., for some vehicle contexts as described, a number of optionally consecutive occurrences of Δtj,j−1 falling in time lapse bin σ+n,m equal to a count CM×σ+n,m, transmission of MSG(IDn) may be considered indicative of an anomaly and may cause an SEU 40 to perform an action as described, e.g., block a message, raise an alarm and so on.

An SEU 40 may respond to an anomalous message and/or an anomaly indicted by a message by undertaking any, or any combination of more than one, of various actions to log and/or report the message, and or, to mitigate, and/or control an effect that the anomalous message may have on vehicle 30 and/or on an in-vehicle network (e.g., on CAN 61).

In some embodiments, a message (e.g., identified by its message ID as described) may be associated with a specific set or plurality of expected repetition times T(IDn,m). In some embodiments, each expected repetition time may be associated with its specific set or plurality of repetition time lapse bins σ−n,m and σ+n,m as described. In some embodiments, each time lapse bin σ−n,m and σ+n,m may be associated with its own, specific anomaly maximum count CM×σ−n,m and each time lapse bin σ+n,m may be associated with a specific anomaly maximum count CM×σ+n,m, for example, as schematically exemplified in FIG. 3B.

Reference is made to FIG. 3B which schematically shows a timing diagram according to illustrative embodiments of the present invention. FIG. 3B schematically shows a timing diagram for determining whether or not a CAN message characterized by a plurality of different repetition periods is an anomalous message in accordance with some embodiments of the invention. FIG. 3B schematically shows a schematic timing diagram 404 that illustrates temporal relationships between repetition periods of a message MSG (IDn) associated with a plurality of M=4 expected repetition times T(IDn,m), each associated with optionally two repetition time lapse bins σ−n,m and σ+n,m. Each time lapse bin σ−n,m and σ+n,m may be associated with an anomaly maximum count CM×σ−n,m and each time lapse bin σ+n,m may be associated with an anomaly maximum count CM×σ+n,m. Any number of expected repetition times T(IDn,m) (e.g., more or less than 4 in the above example and as shown by FIG. 3B) may be used by embodiments of the invention.

Figure 4A:
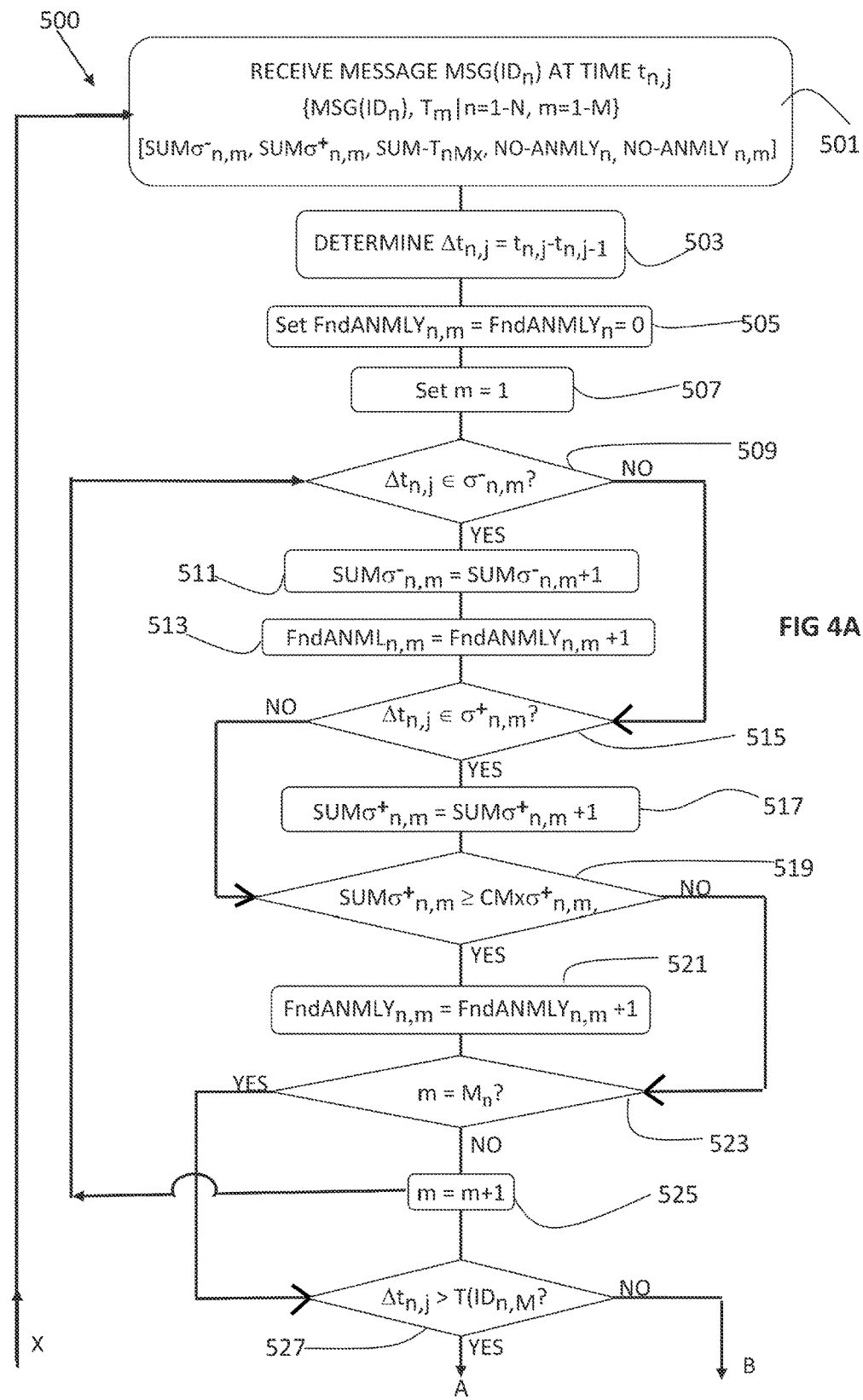
FIG. 4A shows a flowchart of a method according to illustrative embodiments of the present invention.
Figure 4B:
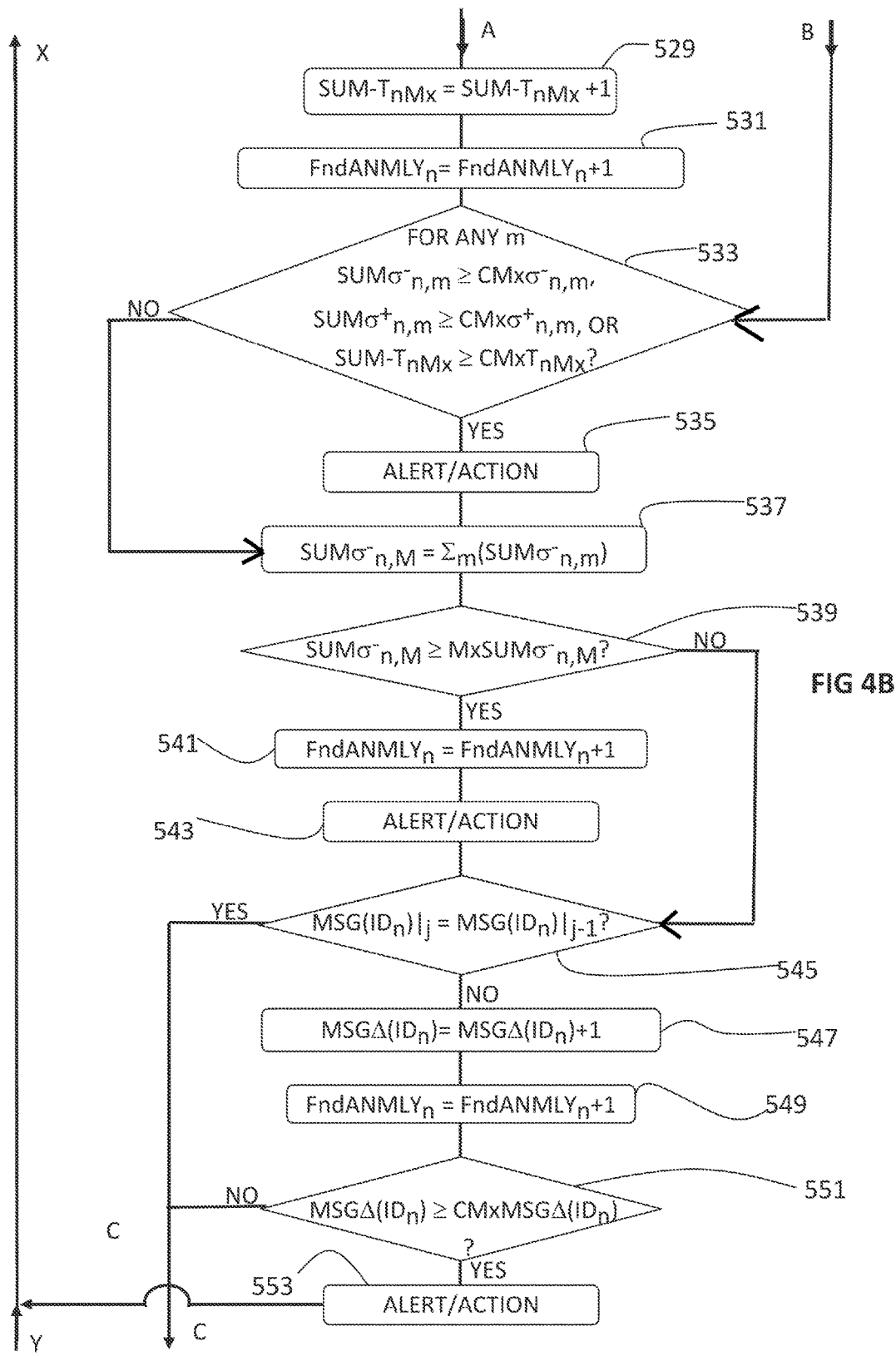
FIG. 4B shows a flowchart of a method according to illustrative embodiments of the present invention.

Reference is made to FIGS. 4A, 4B and 4C that show flowchart 500 of a method according to illustrative embodiments of the present invention. As with other flowcharts and embodiments described herein, processing units other than an SEU may be used, and messages other than CAN messages may be used. Furthermore, specific counters and data constructs are described, but as with other embodiments described herein, other counters and data constructs may be used. For example, flow or method 500 may be carried out by processor 41 included in an SEU 40 as described. Flow 500 may be used, or carried out, by some embodiments in order to determine whether or not a CAN message propagated over an in-vehicle communication network is an anomalous message, and/or is related to an anomaly, in accordance with some embodiments of the invention. A message may be referred to as anomalous if it is anomalous or it indicates an anomaly.

As shown by block 501, at a time tn,j, an SEU may receive a CAN message MSG(IDn) and optionally has integer counter values acquired responsive to receptions of earlier messages MSG(IDn) that are stored in integer counters SUMσ−n,m, SUMσ+n,m, SUM−T−n,m, NO−ANM-LYn, and NO−ANMLYn,m, for example, the counters may be stored in memory 45 and/or 46. As shown by block 503, processor 41 may determine a time lapse $\Delta tn,j=(tn,j-tn,j-1)$ between time tn,j and a time tn,j−1 at which a preceding, or an immediately previous message MSG(IDn) was receive by processor 41 or by an SEU 40. As shown by block 505 processor 41 may set counters FndANMLYm and FndAN-MLYn equal to zero and as shown by block 507 processor 41 may set an integer m to one (as shown by m=1).

As shown by decision block 509, processor 41 may determine whether or not $\Delta tn,j$ has a value that falls in time lapse bin σ−n,m. If $\Delta tn,j$ does not fall in time lapse bin σ−n,m then processor 41 may proceed to a decision block 515 as shown by the arrow connecting blocks 509 and 515. If $\Delta tn,j$ does fall in time lapse bin σ−n,m then processor 41 may proceed to block 511 as shown and may increase SUMσ−n,m by 1 as shown. As shown by block 513 a register or counter FndANMLY n,m may be increased (e.g., by one "1" as shown) in order to record or indicate that an anomaly was found for expected repetition period T(IDn,m)

As shown by block 515, processor 41 may determine whether or not $\Delta tn,j$ is a value that falls in time lapse bin σ+n,m. If $\Delta tn,j$ does not fall in time lapse bin σ+n,m then processor 41 may proceed to a decision block 519 as shown. If $\Delta tn,j$ does fall in time lapse bin σ+n,m then processor 41 may increase SUMσ+n,m by 1 as shown by block 517.

As shown by block 519, processor 41 may determine whether or not a count in counter SUMσ+n,m has reached a maximum count CM×σ+n,m. If the count is equal to, or greater than, the maximum, CM×σ+n,m then processor 41 may increase FndANMLYn,m by 1 as shown by block 521. If SUMσ+n,m is less than CM×σ+n,m then processor 41 may skip the operation shown by block 521 and proceed directly, to decision block 523 as shown by the arrow connecting blocks 519 and 523.

As shown by decision block 523, processor 41 may determine whether or not "m" is equal to "Mn", and if it is not, processor 41 may increase m by 1 as shown by block 525, and from block 525 the flow may return to block 509 to proceed through blocks 509 to block 525 with the increased value for m. If, e.g., e.g., in block 523, it is determined that m is equal Mn then a flow may proceed to a decision block 527 as shown by the arrow connecting blocks 523 and 527.

As shown by decision block 527, a flow may include determining whether or not $\Delta tn,j$ is greater than a maximum repetition period, T(IDn,M), associated with message MSG (IDn). If $\Delta tn,j$ is greater than maximum repetition period T(IDn,M) then the flow may include increasing a counter SUM−TnMx by 1 as shown by block 529 (in FIG. 4B). As shown by block 531, a flow may include increasing a FndANMLYn counter by 1. If $\Delta tn,j$ is not greater than T(IDn,M) then a flow may include determining whether or not any of counts SUMσ−n,m, SUMσ+n,m, (that is for any "m" for which 1≤m≤M), and SUM−TnMx are equal to, or greater (or exceed) their respective maximum counts CM×σ−n,m, CM×σ+n,m, or CM×TnMx as shown by block 533. If none of the counts or counters SUMσ−n,m, SUMσ+n,m, and SUM−TnMx is equal to, exceeds, or is greater than its respective maximum value (e.g., the values in CM×σ−n,m, CM×σ+n,m and CM×TnMx) then the flow may proceed to block 537 as shown.

If one or more of the counts or counters exceeds its respective maximum then, as shown by block 535, a flow may include generating an alert that a number of detected anomalies requires attention and/or undertake any, or any combination of more than one, of various response actions to log and/or report the anomalies, and or, to mitigate, and/or control an effect that the anomalous messages MSG(IDn) or their cause may have on vehicle 30 and/or on an in-vehicle network.

As shown by block 537 a flow may include setting the SUMσ−n,M object to be the sum of the SUMσ−n,M objects (as shown by SUMσ−n,M=Σm(SUMσ−n,m)). As shown by decision block 539, a flow may include determining whether or not SUMσ−n,M is equal to or greater than a maximum M×SUMσ−n,M. As shown by block 541, if SUMσ−n,M is equal to or greater than a maximum M×SUMσ−n,M then a flow may include increasing FndANMLYn by 1.

As shown by block 543 a flow may include generating an alarm or undertakes one or more response actions such as optionally those noted with respect to block 535. As shown by block 545, if SUMσ−n,M is less than M×SUMσ−n,M a flow may include determining whether or not message MSG(IDn) received at time tj is the same as message MSG(IDn) received at time tj−1 and, if it is not, then a flow may include increasing a counter MSGΔ(IDn) by 1 as shown by block 547. As shown by block 549, if MSG(IDn) received at time tj is not the same as message MSG(IDn) received at time tj−1 then a flow may include to increasing counter FndANMLY by 1.

As shown by decision block 551, a flow may include determining whether or not the total count for MSGΔ(IDn) is equal to, or greater than, a maximum value stored in a CM×MSGΔ(IDn) counter, and, if it is then, as shown by block 553, a flow may include raising an alarm and/or undertakes one or more response actions such as optionally those noted with respect to block 535.

As shown, from block 535 the flow may return to block 501 to receive another or next message MSG(IDn), where the other or next message may have a same or different value for index n as the value for index n of the MSG(IDn) received at time tj. If it is determined, e.g., as shown by decision block 545, that MSG(IDn)|j=MSG(IDn)|j−1, or as shown by decision block 551 that MSGΔ(IDn)≥CM×MSGΔ (IDn), then a flow may proceed to block 554 shown in FIG. 4C, e.g., a flow may include setting m to one ("1") as shown by m=1 in block 554.

As shown by decision block 555, a flow may include determining whether or not the value of FndANMLYn,m is zero (as shown by FndANMLYn,m=0 in block 555), and if the value of FndANMLYn,m is zero then a flow may include increasing a counter NO−ANMLYn,m by 1 as shown by block 557. If it is determined, e.g., in decision block 555, that FndANMLYn,m is not equal to zero then a flow may include determining whether or not the number of counts counted in NO−ANMLYn,m indicates that a number of non-anomalous, consecutive messages MSG(IDn) that were received (e.g., by an SEU as describe) and that are associated with repetition period T(IDn,m) is equal to a maximum CM×NO−ANMLYn,m as shown by block 559 and, if so, (e.g., the number of consecutive messages as described reached the threshold in CM×NO−ANMLYn,m) then a flow may include resetting (or setting) counters SUMσ−n,m, SUMσ+n,m, and NO−ANMLYn,m to zero as shown by block 561. If it is determined that NO−ANMLYn,m is not equal to CM×NO−ANMLYn,m as shown by block 559 then a flow may include determining whether or not m=Mn as shown by block 562.

If it is determined that m is not equal to Mn then a flow may include increasing m by one as shown by block 563. As shown, a flow may return, from block 563 to block 559. If it is determined that m is equal to Mn (e.g., in block 562), then a flow may include determining whether or not FndAN-MLYn is equal to zero ("0") as shown by block 564. As shown, if FndANMLYn is not equal to zero then a flow may return to block 501. If FndANMLYn is equal to 0 then a flow may include increasing counter NO–ANMLYn by 1 as shown by block 565.

As shown by decision block 567, after increasing NO–ANMLYn by one, a flow may include determining whether or not a number of counts counted in NO–ANM-LYn indicates that a number of consecutive non-anomalous signals or messages MSG(IDn) (e.g., received by an SEU 40) that are associated with repetition period T(IDn,m) is equal to a maximum CM×NO–ANMLYn. If the number of consecutive non-anomalous signals or messages as determined in block 567 is not equal to CM×NO–ANMLYn then a flow may return to block 501 as shown. If NO–ANMLYn is equal to CM×NO–ANMLYn then a flow may include resetting or setting counters SUM–TnMx, NO–ANMLYn, MSGΔ(IDn) to zero as shown by block 569. As further shown, from block 569 a flow may return to block 501.

Additional anomaly detection methods that an SEU 40 in accordance with some embodiments of the invention may be implemented, may include at least one, or any combination of more than one of: monitoring of the recent frequency of messages, per message group or ID. If a frequency changes to a different value (e.g., crosses a certain threshold value) and the change is maintained for a certain amount of time, an SEU 40 determine the change is related to an anomaly and may act as described; determining a frequency or the time that passed since the data of a specific message ID has changed and, upon detecting a change in data in messages with the same message ID, determining at least on message is anomalous or related to an anomaly. For example, detecting a change in data can help, or be used to, detect cases where two entities in the network are competing and each is trying to send a message with different data (for example a malicious attacker may try to override the contents of a message that another legitimate ECU in the network is trying to send). For example, an SEU 40 can compare the time since the last change in the data of a specific message ID to a specific threshold and alert if the rate of change is too high. This may also be attenuated by allowing a certain number of consecutive violations of the rule above after which an SEU 40 would alert or otherwise act as described.

Detecting anomalies may include performing analysis on a per signal basis, instead of per message. For example, message may include several signals, all packed together in the same message and each signal may have a different meaning in the in-vehicle context, each signal may be allowed to change in different rates). For example, the timing threshold may differ between different signals of a message.

Some messages may contain a CRC and/or message counter values or other ways used for validating or error checking the messages or message content (including for example cryptographic signatures on the message). For example, a protocol or configuration may force an ECU generating a message to include a counter in the message, where the value of the counter must increase in each message (of the same type, or having the same message ID) sent. An ECU receiving a message may validate the counter value to make sure that indeed the value is increasing and is matching the expected value. Such messages may be checked by an SEU 40 to make sure that the message is valid. For example, an SEU 40 may keep track of the expected counter values for each message ID and, should a message appear on the in-vehicle network with invalid counter value, the SEU 40 may detect this as an anomaly. Same goes for invalid CRC or signature values.

Some messages on an in-vehicle network may present deviations from the fixed cycle timing (for example event based messages). However, despite some messages being introduced to the in-vehicle network between the fixed cycle intervals, the fixed cycle messages are generally still being sent on the in-vehicle network, according to their predetermined cycle time. A malicious entity on the in-vehicle network may attempt to inject malicious messages to the in-vehicle network which may look like a genuine deviation from the fixed cycle. However, the malicious entity will generally try to modify the data in a message it is sending (that is, the data in a message sent by an attacker may be different from the data in a genuine message even though other parts of the message, e.g., the message ID, counter and the like may be the same as, or as expected, in a genuine message) therefore the fixed cycle messages that are expected to be seen on the bus and will be sent by the genuine source of these messages are expected to carry different data from the data of the injected messages. Therefore, some scenarios may benefit from having an SEU 40 try to keep track of cyclic messages and compare their data, content or payload to the data, content or payload of the previous message seen of this message ID. Differences in data, content or payload discovered, detected or identified as described may cause an SEU 40 to indicate an anomaly, e.g., indicate an intrusion on, or into, an in-vehicle network and may further cause an SEU 40 to act as described, e.g., disconnect a node from an in-vehicle network, isolate a portion of an in-vehicle network from the rest of the network and so on. While some examples described herein relate to detecting purposeful or malicious actions altering or adding messages, in other embodiments errors or malfunctions may produce or alter messages, and such errors may be detected.

An expected cycle time of one type of message may be related, by an SEU 40, to the measured cycle time of another type of message. For example, an increase in the frequency of a message with a certain ID may be expected, by an SEU 40, to appear with an increase in frequency of messages with a different ID. The lack of such correlation may be identified by an SEU 40 and used, by the SEU 40 to determine an intrusion into an in-vehicle network occurred.

Some signals may be expected, by an SEU 40, to change in a relatively "smooth" manner Meaning, the rate of which the signal is changing may be bounded. For example, the speed of the vehicle is expected to change over time from one value to another at a rate that is limited by the acceleration properties of the vehicle. An SEU 40 in accordance with an embodiment of the disclosure may look for, or interpret, extreme changes in these values or signals as indications for intrusions.

Since an SEU 40 in accordance with an embodiment of the disclosure may be required to keep track of the last timestamp for each message ID, different thresholds for different message IDs, as well as other per ID information and different conditions for the validity of each monitored ID, and since an SEU 40 may be implemented as an embedded system with strict resource constraints, in some embodiments, an SEU 40 may be adapted to access per ID data at $O(1)$ or $O(\log N)$ time as known in the art, where N is the number of IDs recognized by the vehicle. Such configuration may allow an SEU 40 to handle hundreds of possible IDs out of a range of for example $2^{29}$ usable (Extended CAN) IDs without introducing intolerable delays. This may be done by using a data structure that may contain a pre-calculated array of all IDs that should be handled, sorted in a way that allows an SEU 40 to quickly find the appropriate data associated with each ID in $O(\log(N))$ using a binary search. This will also only require O(N) space. The importance (urgency of each ID) or prevalence of IDs may also be taken into account to give some IDs precedence over others.

An SEU 40 in accordance with some embodiments of the invention may adapt its detection parameters over time in order to reduce its false positive and/or false negative detection rates optionally by receiving feedback in the form of configuration updates to parameters or values in a model and/or other attributes of the SEU 40. Several SEUs, each installed in a different network may be linked together by at least one common external hub. The hub may orchestrate and manage the parameters of the SEUs in all these networks. For example, several vehicles in a fleet may all be communicating with the same hub, which may issue configuration updates to all the SEUs in the fleet. The hub may be cloud based.

The hub may collect information from the vehicle about anomalies and details regarding the specific messages involved in the anomaly decision making process of SEUs 40 that communicate with the hub. The hub may aggregate and process the information in order to fine tune the parameters of the SEUs, using the above mentioned configuration updates. The hub may optionally provide an overview of the cyber security and/or operational status of the entire fleet to the fleet's operators.

Reference is made to FIG. 5 that shows an exemplary model (e.g., a timing model) according to some embodiments of the invention. For example, data shown by tables 580 and 590 may be included in model 136. In some embodiments, a model (e.g., model 136 that may be, or may include, a timing model) may include a set of expected time intervals or periodicities for a respective set of message IDs. In some embodiments, a timing or other model may include a set of contexts to be used for a respective set of time intervals or periodicities. In some embodiments, a timing model may include a set of thresholds, e.g., some or even all expected time intervals or periodicities in a timing model may be associated with one or more thresholds. A timing model may be provided to an embodiment, e.g., downloaded into storage system 130 as shown by model 136 wherefrom it may be read by an SEU 40. A timing model may be created and/or updated by an embodiment. For example, an SEU 40 may create and update information in a timing model based on measuring time intervals between messages as described herein, determining a context and updating a timing model. A timing model (e.g., model 136) may be, or may be included in a file stored in storage system 130. Any other object or construct may be used in order to store and maintain a timing or other model in storage system 130 or elsewhere, e.g., a linked or other list, a set of objects in a database and the like may be used in order to include a timing or other model in a system.

Accordingly, a timing model may include any definitions, thresholds or other data usable for determining whether or not a message or set or sequence of messages is related to an anomaly, e.g., by determining a context and by comparing measured time intervals between messages to values in a timing model (e.g., values that may be context specific, in the timing model). For example, tables 580 and 590 shown in FIG. 5 and described herein may be, or data similar data in these tables may be included in, a timing model. The operations performed by a processor or an SEU 40 may include creating, storing or maintaining a timing model of an expected behavior of data messages or other communications over the in-vehicle communication network. For example, an SEU 40 may create and/or update a timing model for, or related to, messages communicated over an in-vehicle communication network by recording or storing, per message ID and per context, time intervals between messages.

It will be noted that the simplified model (in the form of table 580) shown in FIG. 5 is provided in order to describe exemplary data that may be included in a model (e.g., in model 136) and that any construct, method or system may be used in order to maintain a model as described herein. For example, any objects and methods known in the art (e.g., in databases) such as linked lists, pointers or other references may be used in order to maintain a model, e.g., maintain model 136 in storage 130 operatively connected to a controller 105 embedded in an SEU 40 as described. As shown by the ID column 581, a model may include an entry for each message ID. Accordingly, when an SEU 40 receives a message sent over an in-vehicle network as described, SEU 40 may find any rules, criteria and/or possible actions related to the message ID using a model. As shown by columns 582, 583 and 584, a number of time intervals and related or associated contexts may be included in a model. For example, "12/3" in column 582 of the entry of message 17 indicates that if the context (identified or determined as described herein) is "A" then a time interval threshold used by an SEU 40 as described herein may be 12 milliseconds (ms), similarly, as exemplified in column 583 of message 17, if the context is "B" when a message with an ID of 17 is received then a time threshold used may be 16 ms and so on. Accordingly, determining a message is related to an anomaly may be based on a context.

Various thresholds may be included in a model. For example, and as shown by columns 585 and 586, different thresholds for each message ID may be included such that thresholds are used or applied based on a message ID. For example, the value of "3" in column 585 of the entry of message 17 may indicate the number of unexpected intervals allowed for messages with ID 17. For example, if the time intervals between more than 3 consecutive messages with an ID of 17 deviate from an interval indicated in one of columns 582, 583 and/or 584 then an SEU 40 may perform an action, e.g., disconnect the node that generates messages with ID 17 from the network, raise or send an alarm, log an event in storage system 130 and so on. As shown by columns 585 and 586, a number of thresholds may be associated with each message ID. For example, column 585 may include, for each message ID as shown, the threshold related to the number of messages received with an unexpected timing as described and column 586 may include, for each message ID as shown, the threshold related to the number of messages received with an unexpected content as described. A model may include an action.

For example, as shown by column 587, a set of actions may be indicated for each message ID. As shown, for some message IDs, a number of actions may be listed in a model and logic in an SEU 40 may select one of the actions listed. For example, logic or configuration of an SEU 40 may dictate that if the threshold interval of "12" for context "A" as indicated by "12/A" in column 582 for message 17 is breached then an action taken by an SEU 40 is blocking the message (or subsequent messages with message 17), and, the logic or configuration may further dictate that reporting or logging an event will be performed in other cases, e.g., if the threshold interval of "16" for context "B" as indicated by "16/B" in column 583 for message 17 is breached then an SEU 40 may log the breach in storage system 130. As shown, for some message IDs, only one action may be possible, e.g., any event (e.g., wrong or unexpected content or timing) related to message ID 3 may cause an SEU 40 to block the message (or any subsequent messages with ID 3) and, as shown, event related to messages with ID 6 may cause an SEU 40 to only log the events. Various other entries or fields may be included in a model. Any rules for processing messages as described herein may be included in a model, e.g., in the form of entries as shown in FIG. 5 that may be used by logic included in an SEU (e.g., in the form of executable code 125) to apply rules. Accordingly, an embodiment may determine whether or not a message is related to an anomaly and/or whether or not a message complies with a model based on a context. If an embodiment determines a message is related to an anomaly then the embodiment may perform an action as described, and, if an embodiment determines a message is unrelated to an anomaly (or determine the message is valid) then the embodiment may record data related to the message, calculate a value based on the message (e.g., an average as described) or an embodiment may ignore the message, e.g., proceed to examine a next or subsequent message without performing any action related to the non-anomalous message.

A plurality of contexts may be defined, known or identified by a system and method according to some embodiments of the invention. Table 590 shown an exemplary set of contexts. Data as shown in table 590 may be stored, e.g., in in model 136 in storage system 130 connected to an SEU 40 as described. As shown by column 591, a name or identifier for each context may be stored such the contexts may be referred to, e.g., in a model as described. It will be understood that may construct, object, system or method may be used by embodiments of the invention in order to store, maintain and use contexts and that table 590 is an exemplary and simplified representation of contexts. As shown the description column 592, a context may be related to a vehicle's state or operation (e.g., engine is running, vehicle is accelerating), a context may be related to an in-vehicle network (e.g., an intrusion to the network was detected) and a context may be related to nodes attached to an in-vehicle network (e.g., a fault in, or malfunction of, a node or component attached to the in-vehicle network detected). A context may be a combination of contexts or a complex context. For example, with respect to table 590, if a vehicle is accelerating and the engine is running then a combined or complex context as defined and used by an SEU 40 may be "A/B". For example, a context of "A/B" may be treated, or identified, by an embodiment, as normal while a context of "A" without "B" may indicate an anomaly or even real danger. For example, a context (e.g., as represented by table 580) including "A" but excluding "B" may mean the vehicle is accelerating downhill while the engine is not running or it may mean an intruder or hacker is sending malicious messages over the in-vehicle network. Accordingly, and as further described herein, an anomaly may be detected or identified according to, or based on, a context that may be a complex context.

For example, and as shown by column 592, the current states or contexts in effect may be marked or checked and the effective, combined, complex, or current context or state may be defined, identified or determined, by, or based on, all contexts checked or marked as exemplified in FIG. 5. Logic in an SEU 40 may prioritize contexts when needed, or select a portion of a complex or combined context value. For example, an SEU 40 may ignore the portion of a context that indicates that the infotainment system is on (e.g., the context includes "C" as shown in table 590) when processing a message received from a sensor that monitors and reports engine oil pressure.

As noted, FIG. 5 shows exemplary data that may be included in a model, however, other data may be included in a model. For example, although not shown in FIG. 5, information related to events may be included in a model and used for determining whether or not one or more messages are related to an anomaly. Any other models may be included in and/or used by, a system according to some embodiments of the invention. Any timing model that includes at least an expected time interval between messages may be used. For example, an SEU 40 may receive first and second messages with the same ID that were communicated on a network, determine, based on a model that includes an expected time interval (or threshold) and based on a measured or calculated time interval between the first and second messages, whether or not at least one of the first and second messages is related to an anomaly (e.g., by comparing the measured and expected time intervals) and, if the SEU determines, that at least one of the first and second messages is related to an anomaly then the SEU may perform at least one action related to the messages or to the anomaly as described.

Operations performed by an SEU 40 as described herein may be performed in real-time. Generally, "real-time" (also known and referred to in the art as "realtime", or "real time") as referred to herein relates to processing or handling of events and acting as described at the rate or pace that the events occur, identified or received (possibly defined by human perception). For example, an SEU 40 according to embodiments of the invention may process messages at the rate or pace messages are received. An SEU 40 may act in real-time, e.g., within milliseconds or other very brief periods after a message is transmitted on an in-vehicle network so that an action related to a message or an anomaly is performed virtually immediately. For example, an SEU 40 may, in real-time, determine a deviation from a timing constraint or from an expected content in a message and alert, disable a node, or block messages, substantially immediately when a deviation or anomaly occurs, or is detected.

Accordingly, in some embodiments, maintaining a timing or content model and performing an action are performed in real-time. For example, determining, whether or not a message complies with a timing or content model and/or determining whether or not a message is related to an anomaly, and if the message does not comply with the model or is related to an anomaly, performing at least one action related to the message may all be done, performed or carried out, in real-time, e.g., at the rate messages are received by an SEU 40 or immediately when a message is received by the SEU 40. Generally, complying with a model as referred to herein relates to meeting a criterion. For example, an SEU may determine that a behavior complies with a model if time intervals between messages are not shorter than a time interval included in a model, e.g. a threshold. In some embodiments, an SEU may determine that a behavior complies with a model if content in a message is as indicated or included in a model or is as expected based on a model.

A message, number of messages, or a behavior, may be considered (e.g., determined or identified by an SEU) as not compliant or incompliant with a model if content in a message is different from a description, characterization or definition of content in a model or if a time interval, number of messages during a time period or other timing values or aspects related to the messages or behavior (e.g., as monitored, measured or determined by an SEU), are different from timing values in a model. For example, if a time interval between two sequential messages with the same ID is within a range, or according to a value or threshold included or indicated in a model then an SEU may determine the messages comply with the model and/or the SEU may determine that a behavior represented by the messages complies with the model. Similarly, if a time interval between two sequential messages with the same ID is shorter than a range, threshold or other value included or indicated in a model then an SEU may determine the messages do not comply with the model. With respect to content, if content in a message is not as defined, represented, or indicated in a model then an SEU may determine that the message does not comply with the model. Accordingly, an embodiment may be determined whether or not a message or behavior complies with the model.

An embodiment for providing security to an in-vehicle communication network may include a non-transitory computer readable medium or computer storage medium (e.g., memory 120 or memory 45) including instructions (e.g., executable code 125) that, when executed by at least one processor (e.g., controller 105), cause the at least one processor to perform methods discussed herein, such as cyber-security timing-based enforcement operations for, or in, a vehicle. The operations performed by a processor may include maintaining a timing and/or content model of an expected behavior of messages or other data communications over the in-vehicle communication network. For example, a model may include data and values as shown by table 580 and described herein.

A controller may receive a message sent on a network (e.g., a message sent by a node connected to an in-vehicle communication network), for example, an SEU 40 may receive messages sent over CAN 61 as described. A controller may determine, based on the model and based on a timing attribute of the message, whether or not the message complies with the model. For example, to determine a timing attribute of a message, an SEU 40 may record (e.g., in storage 130 or in memory 45) the time a first message with message 17 was received and may calculate a time difference or time interval for message 17 when, and based on, a second, subsequent message with an ID of 17 is received. In order to determine whether or not the message complies with a model, an SEU 40 may compare an interval or time difference calculated as described to an entry or data in a model. For example, an SEU 40 may compare a time interval measured or determined as described to a time indicated in table 580 that may be, or may be used as, a timing model.

If a message does not comply with a model (or specification, rules or criteria in a model as described) then an SEU 40 may perform at least one action related to the message. An action performed by an SEU 40 when detecting an anomaly (e.g., a deviation from a timing constraint) may, for example, include: disabling a component connected to the network, disconnecting or isolating a portion of an in-vehicle network (or other network) from the rest of the in-vehicle network (or other network), disconnecting or isolating a node on an in-vehicle network from the rest of the in-vehicle network, activating a component connected to the network, blocking a message, avoiding routing or forwarding a message, e.g., avoid, or refrain from, forwarding or routing a message to its destination or to a specific portion of an in-vehicle network, delaying a message, limiting a frequency of a message type, logging a message and warning or alerting. In some embodiments, an action performed by an SEU 40 may include sending, over an in-vehicle network, an error or warning message that may cause nodes on the in-vehicle network to ignore or disregard a specific message. For example, a protocol adhered to by nodes on an in-vehicle network may enable sending (or broadcasting) a special message that can cause nodes to refrain from receiving or processing messages (e.g., ignore or disregard a specific number of past or future messages or ignore messages sent in a specified time period).

Blocking a message may include destroying a message being communicated over a network or communication bus while the message is communicated. For example, in some embodiments, in order to block a message, an SEU 40 may send a CAN error frame, signal or message on a network of bus that may destroy another message that is currently communicated. In some embodiments, an SEU 40 may corrupt (or destroy) a message while it is being transmitted on the bus by sending data (e.g., one or more dominant bits as known in the art) on the bus during the transmission of the message.

Disabling a component connected to the network may be done, e.g., by an SEU 40, by communicating with the component and configuring the component. For example, SEU 40C may send, over an in-vehicle network and to infotainment 79, a message that will cause infotainment 79 to shut itself off.

Any protocol or message types or formats needed in order to communicate with nodes on an in-vehicle network may be stored, e.g., in storage 45 or in storage system 130 and, accordingly, an SEU 40 may be able to readily and freely communicate with nodes on an in-vehicle network. Accordingly, an SEU 40 may configure or re-configure nodes, may obtain data or information from nodes (e.g., their state and the like) and may, for example, turn nodes on or off.

Disconnecting or isolating a portion of an in-vehicle network from the rest of the in-vehicle network may be done or achieved by an SEU 40 by configuring nodes on an in-vehicle network. For example, in order to isolate the low speed bus 71 shown in FIG. 1C, SEU 40 may send a message to CAN gateway 80 instructing CAN gateway 80 to prevent any data from flowing between low speed bus 71 and high speed bus 61 thus effectively isolating low speed bus 71 from the network. Accordingly, an embodiment (e.g., a processor in an SEU 40) may be configured to isolate a portion of a network (e.g., a portion of an in-vehicle network such as high speed CAN bus 61) from the rest of the in-vehicle communication network in order to isolate a source of a message related to an anomaly.

A first SEU 40 may disconnect or isolate a portion of an in-vehicle network by communicating with another, second SEU 40. For example, to isolate low speed bus 71, SEU 40C may instruct SEU 40D to block all messages from low speed bus 71. Disconnecting or isolating a node of an in-vehicle network from the rest of the in-vehicle network may be done by configuring a component on the network, e.g., configuring an SEU 40. For example, to disconnect GPS 77 from the network, SEU 40C may instruct SEU 40D to block (or drop as known in the art) messages to/from GPS 77.

Activating a component connected to the network may done or achieved, by an SEU 40 by sending a message to the component. For example, using protocols and message formats stored as described, an SEU 40 may send a message to environment control 74 in order to turn the air conditioning on or off. Blocking a message may include causing a component (e.g., CAN gateway 80) to selectively block (e.g., drop as known on the art) messages. Blocking messages may be done by an SEU 40. For example, SEU 40C may selectively prevent messages from telematics 78 from reaching an in-vehicle network (e.g., based on message IDs SEU 40C may drop messages coming from telematics 78 but forward messages coming from infotainment 79). Delaying a message may include storing the message and transmitting the message at a later time. For example, SEU 40C may store a message received from telematics 78 and, possibly based on a condition or state (e.g., when a state of vehicle 30 changes from A to B) transmit the message to its destination. Limiting a frequency of a message may be based on the type (e.g., ID) of the message. For example, SEU 40C may block some of the messages arriving from door control 75 such that the frequency of these messages on the in-vehicle network is reduced or lowered.

Logging a message may include storing any information related to a message. Information or data logged or stored as described may include forensic information that may include, for example, description or attributes of previous messages sent or seen on a network, contexts (e.g., a number of contexts in a context vector) of a vehicle, network or nodes, and any other parameters or values that can help an offline analysis of an attack. Logged, stored or recorded information may include any, or all of the, information required in order to recreate an in-vehicle decision regarding a message or attack in an offline procedure. For example, by storing all messages sent over an in-vehicle network, contexts and data internal to an SEU 40, the performance and decision making of an SEU may be examined and/or debugged as known in the art. Logging, storing or recording information as described may be done in a secure portion of a system or network. For example, a Hardware Security Module (HSM) may be connected to an in-vehicle network and may be used to store, log or record data such that only authorized entities (e.g., a technician or an SEU 40) may be able to access stored data.

For example, an SEU 40 may store, in storage system 130, the time a message was received, the source and destination of the message, some or all of the content (payload) of the message and any other information or data related to the message. Warning or alerting may include sending a text message, electronic mail or any other message. For example, SEU 40b may send a message to telematics 78 that will cause telematics 78 to send a text message or an email to a specified recipient list. Warning may include, or be done, using components in a vehicle. For example, SEU 40C may cause (e.g., by sending a message as described) infotainment 79 do display a warning message, sound an alarm and so on.

In some embodiments, a memory may include a set of messages IDs. For example, the IDs of all messages that may be sent over CAN 61 and/or CAN 71 may be stored in storage system 130 and may be loaded into memory 120 such that an SEU 40 may quickly, in real-time identify and process messages as described.

Using IDs as described, a controller (e.g., embedded in an SEU 40) may monitor time lapses related to a plurality of messages communicated on the in-vehicle communication network and having the same message ID value. For example, time lapses or intervals between messages that include an ID "9" may be monitored and/or content in messages may be monitored or recorded. An SEU 40 may calculate an average time lapse for an ID. For example, by recording a set of time lapses or intervals between messages with an ID of 9, an SEU 40 may calculate an average interval between, or for, messages with ID 9. Based on comparing or otherwise relating an average time lapse to a threshold, a controller (e.g., embedded in an SEU 40) may determine at least one message included in the plurality of messages is related to an anomaly. For example, if the average time interval calculated for a set of ten ("10") sequential messages with an ID of nine is above a threshold (e.g., a threshold as shown in table 580) then an SEU 40 may determine that at least one of the ten messages is related to an anomaly. For example, it may be that the third message in the above exemplary set of ten messages was sent by a malicious entity that managed to break into an in-vehicle network. Another way to group messages to be compared, other than ID, may be used. For example, messages may be grouped by message source, message type, message subject, message payload, message destination, etc.

In some embodiments, having determined that at least one message is related to an anomaly, an SEU 40 may perform one or more actions as described. Similarly, if the average time interval calculated for the set of ten ("10") sequential messages with an ID of nine is below a threshold then an SEU 40 may determine that at least one of the ten messages is related to an anomaly and may perform actions as described. In some embodiments, in order to determine or identify an anomaly, two (e.g., upper and lower) thresholds may be used by an SEU 40 in combination a third threshold related to the number of threshold violations or breaches. Any method may be used in order to calculate an average. For example, an SEU 40 may use a sliding window or exponential smoothing as known in the art in order to determine or calculate an average time interval.

In some embodiments, speed of processing, efficiency, accuracy and/or other aspects may be served, improved or increased by excluding information, values or other data related to a message that is (or is suspected as being) related to an anomaly from a calculation of an average or other timing values. For example, if an SEU 40 determines that a message is anomalous or is related to an anomaly as described then SEU 40 may exclude the message and its timing aspects or values from a calculation of a time interval average and/or otherwise ignore (or skip) the message and its related timing information when updating a timing model.

For example, an embodiment may increase or improve efficiency, accuracy and/or other aspects or computational operations as described by ignoring (with respect to maintaining a model or calculating time averages) a message that is (or is suspected as being) related to an anomaly. An embodiment may improve anomaly detection accuracy by ignoring (with respect to anomaly detection) a message that is (or is suspected as being) related to an anomaly when processing subsequent messages, e.g., when processing a message received substantially immediately after an anomalous message. For example, false positives (e.g., wrongly detecting an anomaly where one does not exist or occur) that may be generated by known systems and methods may be avoided by some embodiments by ignoring in, or excluding from, calculation of an average time lapse, a message that does not comply with a model, as described. Accordingly, embodiments of the invention may improve known systems and methods, e.g., known systems and methods related to time based anomaly detection in networks.

For example, in exemplary case, an SEU 40 may process first, second and third messages with the same ID as described and may calculate or update an average time interval for the ID based on time intervals or distances as described. Then, upon identifying that the fourth message with the same ID is an anomalous message (e.g., the time distance or interval between the fourth and third messages is lower than a threshold as described), the SEU 40 may (in addition to performing one or more of the actions as described) ignore the fourth message with respect to time interval calculations. For example, the time interval between the fourth message and the third message in the above exemplary case may be excluded from a sliding window or other average calculation. For example, in the above exemplary case, having identified that the fourth message is related to an anomaly, an SEU 40 may measure and/or record the time interval between the fifth message and the third message and use this time for further calculation of an average and/or for subsequent discovery or detection of anomalies, thus effectively ignoring the fourth (problematic or anomalous) message and/or excluding the timing of the fourth message from calculation of an average and from identifying anomalies Skipping, excluding or ignoring a message (and its timing) as described may enable avoiding wrongly identifying messages as anomalous.

For example, in the above exemplary case, without ignoring the fourth message as described, the fifth message, that may be a proper, genuine and/or none anomalous may be identified as anomalous, e.g., since its time distance from the fourth message may be shorter than expected. Accordingly, an embodiment may, in real-time, identify an anomalous message, alert, block the message and/or perform other actions as described and further ignore the message in calculations and/or anomaly detection. Since, in some cases, an SEU 40 may receive and process messages in batches (e.g., batches of 5 or 10 messages), skipping, ignoring and/or excluding an anomalous message as described may greatly increase speed of processing, e.g., processing a batch of 10 messages that includes skipping a fourth anomalous message in the batch as described is fast and efficient. For example, including the timing of an anomalous message (e.g., the fourth message in the above example) in calculations of average times as described would wrongly change the average thus negatively effecting the real-time aspects of a system, and may further result wrongly identifying proper messages as anomalous, causing false positive identifications and further negatively affecting real-time proper identification of anomalies.

In some embodiments, thresholds (e.g., included in a model as described) may be dynamic, e.g., thresholds in a model may be dynamically, continuously or repeatedly updated or modified. An SEU 40 may update, define, or set an initial threshold for each message ID and/or context. For example, table 580 may initially be empty and, possibly during a learning stage or phase, an SEU 40 may populate thresholds for messages IDs by recording intervals between messages and possibly determining average intervals. For example, an SEU 40 may identify a set of messages with an ID of 24, record the time intervals between these messages, calculate an average interval and update a threshold for ID 24, in table 580 as described.

An SEU 40 may update any threshold as described including context specific thresholds. For example, a context of a vehicle may be known to an SEU 40. For example, by communicating with an engine control unit (or by examining messages sent by the unit), an SEU 40 may know if the engine is running (a first vehicle context), if the engine is turned off (a second, different vehicle context) and so on. By communicating with nodes on an in-vehicle network as described, an SEU 40 may know, identify or determine a context of the network or of nodes on the network, e.g., are messages properly propagated on the network, are some nodes malfunctioning and so on. Accordingly, since an SEU 40 may be context aware, an SEU 40 may calculate and/or update threshold with respect to context, e.g., entries shown in table 580 may all be dynamically, continuously and/or repeatedly updated or created by an SEU 40. Accordingly, any threshold may be dynamically updated by a system and method according to some embodiments of the invention.

An SEU 40 may identify an event and may identify or determine an anomaly based on the event and/or determine a message is related to an anomaly based on the event. An event may be identified or detected based on a message. For example, opening a door of vehicle 30 may be an event that may cause door control 75 to send a "door opened" message over CAN 61 and/or CAN 71, receiving a "door opened" message may cause an SEU 40 to identify the event. In some embodiments, an SEU 40 may receive any or all messages sent over an in-vehicle network and, accordingly, SEU 40C may receive the "door opened" thus identifying, detecting or determining a "door opened" event occurred. Logic in, or of, an SEU 40 (e.g., encoded in executable code 125) may cause the SEU 40 to determine, detect or identify an anomaly based on events. For example, events may cause an SEU 40 to update or modify a state of the vehicle, nodes or network as described. For example, upon receiving the "door open" message, an SEU 40 may change the state or context of vehicle 30 to some predefined state or context and, as described, subsequent messages sent over the in-vehicle network may be processed in accordance with the state or context as updated. For example, since typically a vehicle is stationary when its doors are open, messages received from traction unit 64 (e.g., indicating speed or other traction aspects) or messages received from suspension control 63 (e.g., indicating movement of the vehicle) may be treated, or identified, by an SEU 40 as an anomaly. Time interval values and/or other thresholds may be updated based on an event. For example, following the "door open" event described above, an SEU 40 may expect very large intervals between messages received from anti-skid braking 66 and therefore, an SEU 40 may update the threshold (e.g., in table 580) of messages from anti-skid braking 66 such that they are associated with a very large expected interval. Accordingly, if while a door of a vehicle is open, frequent messages (e.g., a set of messages with a low time interval between them) received from an anti-skid control unit such as anti-skid 66 may cause an SEU 40 to determine an anomaly. Of course, a state may be updated (or re-updated or reinstated). For example, when vehicles 30's door is closed, a "door closed" message may cause an SEU 40 to update a context or state of vehicle 30, e.g., revert to the context that was in effect before the door was opened.

An embodiment may determine a component connected to in-vehicle communication network is malfunctioning based on one or more messages and the embodiment may generate an indication related to the malfunctioning component. For example, an indication related to the malfunctioning component may be stored or recorded in storage system 130 (e.g., for later offline examination) or an indication related to the malfunctioning component may be a message presented to a driver or technician, e.g., an SEU may use infotainment system 79 as described herein in order to provide an indication related to the malfunctioning component.

For example, based on a message received from a component or node, and based on a data sheet of or other data or description related to, the component or node (e.g., stored in storage system 130), SEU 40A may examine a message received from a node and determine or identify a fault. For example, SEU 40A may receive a message from suspension control 63, compare the payload in the message to a payload stored in storage system 130 and determine, based on a difference between the received and stored payloads, that the suspension system is not operating properly, Since both data in storage system 130 and logic in an SEU 40 may be updated at any time (e.g., using input and output devices 135 and 140 as described), an embodiment may be updated and adapted to handle faults as they are discovered.

A device in an embodiment (e.g., an SEU 40) may calculate a confidence level of a message being related to an anomaly and may perform an action based on the confidence level. For example, and as described, an action performed upon, or in response to, detecting or identifying an anomaly may be based on a confidence level. Accordingly, upon detecting, determining or identifying an anomaly, a system and method according to some embodiments may perform one or more actions as described. A level of confidence that an anomaly was indeed detected may be dependent on a combination factors, e.g., the node who sent the relevant message, the type of message, the message ID and/or the specific method used for detecting the anomaly. For example, the number of times a threshold is breached during a time period may be used for determining a confidence level, e.g., if an SEU 40 determines an anomaly based on three messages with an interval that is smaller or shorter than the expected interval, during a 10 seconds time period, then the SEU 40 may associate the anomaly with a confidence level of 3, but, if three similar messages are received during a 5 seconds time period, the SEU 40 may associate the anomaly with a confidence level of 7.

A device in an embodiment (e.g., an SEU 40) may calculate a confidence level or value of a message being related to an anomaly based on a ratio of anomalous message (or breaches or violations of thresholds) to a time period. For example, in a simplified case, if a time interval different from an expected time interval (a threshold breach) is identified six ("6") time in a ten ("10") seconds time period of then the confidence level related to determining an anomaly that may be calculated or determined (e.g., by 6/10=0.6) may be greater than the confidence level determined for the same threshold if three ("3") breaches occur in a ten ("10") seconds time period (e.g., 0.6>0.3). Any other methods or calculations may be used, e.g., by an SEU 40, in order to calculate or determine a confidence level or value based on the number of anomalies or thresholds breaches and the relevant time period.

Figure 6:
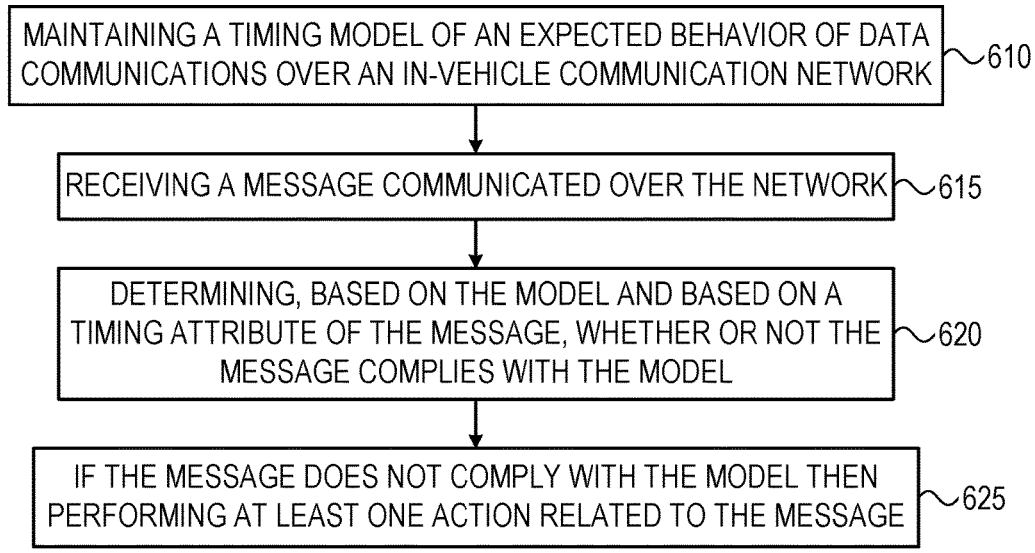
FIG. 6 shows a flowchart of a method according to illustrative embodiments of the present invention.

Reference is made to FIG. 6, a flowchart of a method of providing security to an in-vehicle communication network according to illustrative embodiments of the present invention. As shown by block 610, a timing model of, or related to, an expected behavior of messages or other data communications over the in-vehicle communication network may be maintained (e.g., created and updated). For example, an SEU 40 may create and/or update model 136 based on monitoring time intervals and frequencies of messages communicated over an in-vehicle network as described.

As shown by block 615, a message sent on a network (e.g., a message sent by a node connected to an in-vehicle communication network) may be received. For example, SEU 40A may receive messages sent from nodes on CAN 61 via port 42 as described. As shown by block 620, based on the model and based on a timing attribute of the message, it may be determined whether or not the message complies with the model. For example, the time difference, distance or interval between a received message and a previous message with the same message ID may be calculated or determined (e.g., by subtracting the reception time of the previous message from the reception time of the received message) and the calculated or determined time difference, distance or interval may be compared to a set of time thresholds, differences, laps, distances or intervals, for the message ID, as recorded or indicated in a timing model as described. For example, a set of time thresholds, time differences, time distances or time intervals, for a specific message ID, may be included in a model, for a respective set of contexts as described.

As shown by block 625, at least one action related to the message may be performed if it is determined that the message does not comply with the model. For example, if a time interval between two messages (with the same ID) is shorter than a threshold value indicated or included in model 136 then an SEU 40 may block at least one of the messages, raise, sound or display an alarm (e.g., using infotainment system 79), send an email to a predefined list of recipients, record the event (e.g., in storage 130 wherefrom records or entries may be downloaded for further analysis, e.g., in an offline procedure) etc.

In some embodiments or cases, an action may be, or may include, an explanation, advice or information that may be provided or presented to a user (e.g., to a driver or technician). For example, an SEU may present information to a driver or technician using infotainment system 79, for example, by sending a message to infotainment system 79 that causes infotainment system 79 to display advisory or explanatory information.

For example, an SEU may detect an anomaly (e.g., a violation or breach of a content or timing related threshold as described) and may provide an indication and/or explanation for, or of, the violation. For example, some events (e.g., the driver has suddenly pressed the brakes), may be identified, by an SEU and as described herein, as an exception, irregularity, deviation from normal or expected timing or content, or otherwise unexpected but, based on criteria, logic and other considerations as described, may not be treated or identified by the SEU as an anomaly that requires more than reporting or advising.

For example, referring to the above sudden braking example, if an SEU receives a message indicating the brakes were hit, the SEU may log or record the event, may present a message (e.g., using infotainment system 79 as described) informing the event was detected but may refrain from taking additional action with respect to the message (e.g., refrain from blocking messages or disconnecting traction control 64 or anti-skid braking control 66 units from high speed CAN bus 61).

Determining that an event or message requires only reporting or advising may be based on a context or state. For example, a sudden braking as described may be only reported as described if the vehicle is moving (a first context) but may cause an SEU to perform actions in addition to (or even instead of) reporting if the vehicle is stationary (a second, different context), e.g., since hitting the brakes is unexpected or unlikely if the vehicle is not moving.

Determining that an event or message requires only reporting or advising may be based on a number of events or messages, e.g., a specific set or sequence of messages. For example, referring to the braking example above, if, following a message that indicates (and an event related to) the brakes were suddenly hit, an immediate message informing the SEU that the speed decreased by at least a threshold amount and/or by at least a threshold rate (e.g., the speed of the vehicle changed from 55 mph to 20 mph in two seconds) then the SEU may determine that, although an exception, the event is legitimate, may record and report the event, but may refrain from taking actions taken when an anomaly has been detected as described.

It will be noted that the braking example provided above is a simplified scenario introduced for explanatory purposes and that any logic or criteria involving, related to, using or based on, any number or sequences of messages, timing or intervals between messages and content in messages may be used by an SEU in order to determine whether or not a message or set of messages is related to an anomaly and, if determining or identifying an anomaly, the logic or criteria may be used in order to select an action as described. It will further be noted that methods of identifying or classifying events or messages as described herein may be used for messages and events that may cause an SEU to perform more than reporting or advising as described, e.g., an anomaly that may cause an SEU to block messages or isolate a component as described herein may be identified or detected based on thresholds and a sequence of messages or events as described herein. Accordingly, although as described herein, an SEU may filter some events, e.g., select to only report the events, it will be understood that logic and operations related to advising or reporting as described herein may be performed or carried out in addition to any other action (e.g., blocking messages and the like) as described herein.

Figure 7:
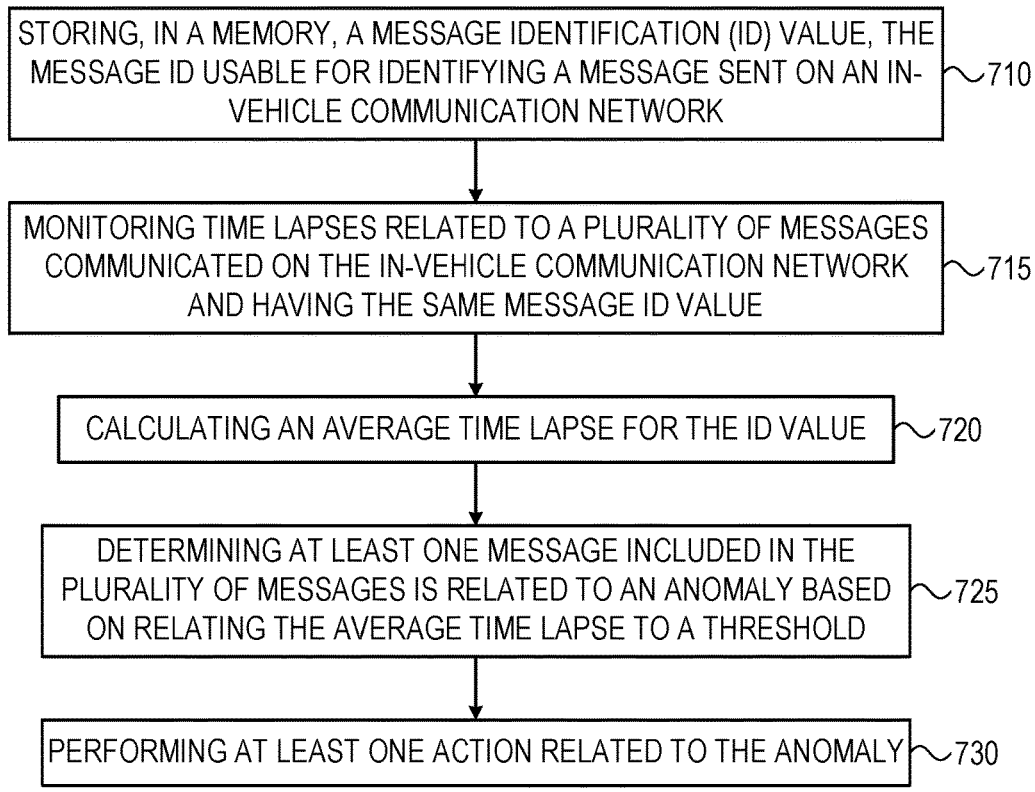
FIG. 7 shows a flowchart of a method according to illustrative embodiments of the present invention.

Reference is made to FIG. 7, a flowchart of a method for providing security to an in-vehicle communication network according to illustrative embodiments of the present invention. As shown by block 710, a message identification (ID) value usable for identifying a message may be stored in a memory. For example, message IDs may be stored in storage system 130 or in memory 45 that may be operatively connected to a controller (e.g., a controller 105 included in an SEU 40 as described). As further described, a controller may be operatively connected to a memory that includes, or is used to store, message IDs and the controller may further be operatively connected to a network, e.g., to an in-vehicle network via ports 42 and 43 as described. As shown by block 715, time lapses related to a plurality of messages communicated on the in-vehicle communication network and having the same message ID value may be monitored. For example, an SEU 40 may monitor messages on an in-vehicle network by examining messages sent over the network, identifying messages with the same ID and record time intervals between receptions of messages with the same message ID.

As shown by block 720, an average time lapse for an ID value may be calculated. For example, by monitoring and recording time lapses or time intervals between a plurality of messages that include the same specific ID, an average time interval or time lapse for the specific ID may be calculated, e.g., using a sliding window or other averaging techniques as known in the art.

As shown by block 725, an embodiment may determine that at least one message included in a plurality of messages is related to an anomaly based on relating an average time lapse to a threshold. For example, an SEU may continuously, dynamically, repeatedly and/or iteratively calculate an average time lapse or interval for a specific message ID and may compare the average to a threshold, e.g., included in model 136. If an average time lapse is lower than a threshold, an SEU may determine that some of the messages received are related to an anomaly. For example, an average may be continuously, dynamically, repeatedly and/or iteratively calculated in real-time such that it continuously represents the time differences or intervals between messages and, accordingly, detecting an anomaly may be done, by an SEU, in real-time. As shown by block 730, an action related to an anomaly may be performed. For example, an action related to an anomaly may include blocking messages with a specific ID (e.g., since these messages may be sent by an intruder or malicious entity), in other cases or embodiments, an action related to an anomaly may be, or may include, isolating a portion of a network such that an intruder, malicious entity or malfunctioning component is isolated from the rest or the network. An action related to an anomaly may be, or may include reporting and/or recording the anomaly, e.g., reporting and recording the message type or message ID, the time the anomaly was identified, a context and the like.

Some embodiments may identify an anomaly and/or anomalous messages and/or detect or identify incompliance with a model based on timing considerations.

Additionally, or alternatively, some embodiments of the invention may identify incompliance with a model, an anomaly and/or anomalous messages based on content in, or of, messages. For example, e.g., based on a configuration, a system (e.g., one or more SEUs) may be adapted to detect or identify anomalies based on timing considerations, or based on considerations related to content, in other cases or configurations, a system may detect anomalies and/or incompliance with a model based on both timing and content considerations as described herein.

Accordingly, an anomaly and/or messages related to an anomaly as referred to herein may relate to unexpected content or content that does not comply with a content model. In some embodiments, an anomaly and/or messages related to an anomaly may be identified, detected or determined based on examining and processing content in messages. For example, and as described, an anomaly, anomalous messages and/or messages related to an anomaly as referred to herein may be, or may be related to messages that include content, metadata, payload (also referred to herein as signal or signals) that deviate, or are different, from an expected content, metadata or payload.

Detecting or identifying anomalous messages and/or messages related to an anomaly may be according to, or based on, content and based on a context. A controller (e.g., included in an SEU) may determine, based on a model and based on at least one attribute content in a message, whether or not the message complies with the model. For example, in some embodiments, content (or attributes of content such as rate of change of a signal through a number of messages) that may be regarded by an embodiment as valid (or unrelated to an anomaly) in a first context but may be regarded, or identified, by an embodiment, as related to an anomaly in a second, different context. The terms "content attribute" and "attribute of content" as referred to herein may relate to any aspect of content in messages. For example, a header in a message (e.g., an ID as described herein) may be an attribute of the payload (content) in the message, e.g., since it identifies the content and/or associates the content (or payload) with a specific source. Of course, a value in a message may be an attribute of a content (or content attribute) but other data may be regarded, or referred to herein, as an attribute. Generally, a payload in a message, a header of, or any metadata in, a message and any values calculated for or associated with content, may be considered as attributes of the content.

Detecting or identifying anomalous messages and/or messages related to an anomaly may be according to, or based on, content and an event. For example, in some embodiments, content (or attributes of content such as a difference in a value of a signal included in two messages) may be regarded by an embodiment as valid (or complying with a model) when detected or seen after a first event is detected, but the same content or attributes may be regarded, or identified, by an embodiment, as related to an anomaly when detected or seen after a detection of a second, different, event or before detecting a third event.

Figures 8, 9:
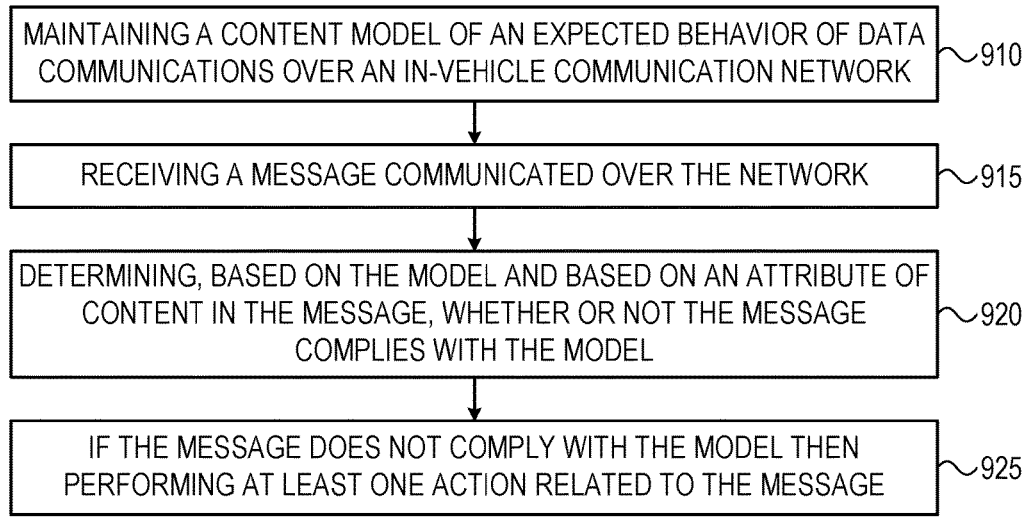
FIG. 8 shows an exemplary model according to some embodiments of the invention.
FIG. 9 shows a flowchart of a method according to illustrative embodiments of the present invention.

Reference is made to FIG. 8 that graphically shows an exemplary (and simplified) data structure that may be used as, or included in, a model (e.g., a content model) according to some embodiments of the invention. For example, data shown by table 800 may be included in model 136. In some embodiments, a model (e.g., model 136 that may be, or may include, a content model and a timing model) may include a set of expected content attributes for, or of, a respective set of message IDs.

It will be noted that the simplified model (in the form of table 800) shown in FIG. 8 is provided in order to describe exemplary data and criteria that may be included in, or represented by, a model (e.g., model 136) and that any object, construct, method or system may be used in order to maintain a content model as described herein. For example, any objects and methods known in the art (e.g., in databases) such as linked lists, pointers or other references may be used in order to maintain a model, e.g., maintain model 136 in storage 130 operatively connected to a controller 105 embedded in an SEU 40 as described. In some embodiments, a model (e.g., model 136) may be, or may include, a timing model and a content model as described herein.

Generally, a content model included in and/or used and maintained by, some embodiments, may include any attributes of content, e.g., representations, descriptions, qualities, characteristics, properties, features, traits or any other relevant aspects of content that may be included in, or carried by messages communicated over a network.

In some embodiments, a content model may include, or may specify, a set of contexts that may be used for processing messages and content as described. For example, contexts as shown by table 590 and described herein may be used for content based anomaly detection as described herein. In some embodiments, a content model may include, or may specify or indicate, one or more sets of: thresholds; expected values; functions; actions; rates of change of content through or across messages and/or any data that may be used for content based anomaly detection as described. As described, logic, decision making and other processing performed, e.g., by an SEU, may be based on data, rules and criteria that may be included, or represented, in a content model.

A model (e.g., a content model) may be, may include, or may be used in order to define, represent, and determine compliance with, an expected behavior. For example, an expected behavior of a specific message (or message ID), or an expected behavior of a flow (e.g., a set or sequence of messages) expressed in words may be: "a difference between first and second values (e.g., included in first and second messages) is less than 5" or "the rate of change of a value across two or more messages is less than 3", "the rate of change of a value in a ten seconds time window is less than 5" or "in a specific context, the value of a signal is constant" or "following a specific event, the value of a specific signal is 3". For example, the exemplary behavior (or expected behavior) of a message ID provided in words above may be defined, represented, or included, in a content model using a set of values in an entry of, or for, the message ID, e.g., entries as shown in table 800 and described in related text. An expected behavior of a message may refer to the behavior of a group of messages having a common message type, message ID, description, etc. Accordingly, since a content model may define and/or represent an expected behavior, a content model may be used in order to determine compliance with an expected behavior.

As describe, nodes connected to a network may send messages (that may include, or be referred to herein as, signals. A difference of, or related to, a signal, or a difference of, or related to, a signal's value as referred to herein may be, or be related to, the difference between a value of the signal as indicated, or included in, a first message and the value of the same signal as indicated, or included in, a second (e.g., a previous or subsequent) message.

For example, an oil pressure unit may send an oil pressure signal that indicates the engine's oil pressure and the signal or value may be associated with and/or identified by, a specific code or identifier. In this exemplary case, if the value of the oil pressure signal in a first message is 54 and the value of the oil pressure signal in a second, subsequent message is 63 then the difference of the signal may be determined to by 9. A difference in or of a signal or value may be calculated or determined based on any at least two messages that may not necessarily by sequential, e.g., a difference of a signal may be calculated based on a first message and a fifth message in a set or sequence of five messages.

A rate of change of a signal may be calculated or determined based on a set of differences of a signal's value, e.g., by iteratively, for a specific signal or signal's value, subtracting a first difference from a second difference. For example, if differences between values of a specific signal in a set of messages or signals are all seventeen ("17") then, e.g., by iteratively subtracting a first difference value from a second difference value (which, in this exemplary case, are all the same, namely seventeen ("17")), an SEU may determine that the rate of change is zero ("0"). In another scenario or case, if a first difference between values or signals is thirteen ("13") (e.g., a first signal's value is two ("2") and a second value of the same signal is fifteen ("15")), a second difference is fifteen ("15") and a third difference is seventeen ("17") then an SEU may determine that the rate of change is two ("2"). A model (e.g., a content model) may be, may include, or may be used in order to define, represent, and determine compliance with, an expected behavior, for example, an expected behavior may include, may be defined by, or may represent, an expected difference between signals (or signals' values) and/or an expected rate of change of signals or values as describe herein.

As shown by the ID column 581, a model may include an entry for each message ID. Accordingly, when an SEU receives a message sent over a network as described, the SEU may readily identify or determine any rules, criteria and/or possible actions related to the message ID using a model. As shown by column 581, a content model may include an ID column that may be and/or may be used as described with reference to FIG. 5.

A model may include, describe or represent complex rules, criteria or logic. For example, any (possibly large) number of rules or criteria may be defined, described or represented, for a specific ID, using sets or combinations of: a function, a context, a threshold and a confidence level, and each rule may be associated with an action.

For example, a result of a specific function (e.g., a function that calculates a rate of change of a signal) applied to a value or signal may be associated with a number of sets of {context; threshold; confidence level; action}. For example, a specific function in a specific context may be associated with different actions based on different confidence levels or the specific function in a specific context may be associated with different actions based on different thresholds.

As shown table 800, a model may include rules (represented by rows in table 800) that may be based on, or related to: an ID (column 581), a function (column 810), a context (column 815), a threshold (column 820), a confidence level (column 825) and an action (column 587). The three entries for ID 17 shown in table 800 are presented in order to exemplify data and/or rules in a model. For example, assuming that "FUNCTION-A" in column 810 represents a function that calculates or determines a rate of change of a signal as described herein, then as shown by row 851, when the context is "A", a threshold used as described herein may be three ("3") and, if the confidence level (e.g., calculated as further described herein) is seven ("7") then an action that may be taken by an SEU may be blocking messages as described herein. As shown by row 852, under similar conditions but with a lower confidence level of three ("3") as shown, an action related to a deviation from an expected rate of change of a signal taken by an SEU may be alerting.

As shown by row 853, if the context is "B" then a threshold of two ("2") may be used and, if the confidence level is determined or calculated to be three ("3") then an SEU may record a breach of the threshold as shown in the action column 587 in row 853. As exemplified by "FUNCTION-B" in column 810 of row 854, rules or descriptions of any number of functions may be included, for a given or specific message ID. For example, FUNCTION-B may be a function that calculates a difference between values or signals as described herein. For the sake of simplicity and clarity, only one threshold column is shown in table 800, however it will be understood that more than one threshold may be used for a single or same function, e.g., as described herein. Accordingly, any number of checks, tests, criteria or rules may be performed or applied to a message in order to determine whether or not the message complies with a model or is related to an anomaly.

By monitoring messages as described and updating a model as described, an SEU may learn and/or determine and record, e.g., in rows as shown by table 800 that may be included in model 136, specific attributes of signals or messages with respect to a specific context and may, as described, calculate or set thresholds in a model. Accordingly, using data in a model (e.g., as shown by table 800), an SEU may validate messages or signals. An SEU may perform any number of verifications or validations in order to identify an anomaly or verify compliance with a content model, for example, any number of checks or validations defined or represented as shown by table 800 and described herein may be performed for a message.

A model may include an expected value, or a representation of an expected value, possibly with respect to context. For example, an expected value column in table 800 (not shown) may include, per context, an expected value of a signal and an SEU may determine a message is anomalous or is related to an anomaly if it does not include or carry an expected value. An SEU may determine a message is anomalous or is related to an anomaly if a value in a message deviates from an expected value by at least a threshold as described.

In some embodiments, even if a value is not as expected (e.g., not as included or represented in a model), other or additional checks and processing may be performed by an SEU in order to determine whether or not the message complies with a model or otherwise identify an anomaly as described. For example, a threshold may be examined and, if the deviation is below a threshold then an SEU may determine that, although the value is not as expected, the message or signal is valid. For example, if a threshold related to a difference or deviation from a value is eleven ("11") then a received value of nineteen ("19") for an expected value of nine ("9"), e.g., a difference of ten ("10") may not cause an SEU to determine that an anomaly was detected or identified. Accordingly, an SEU may validate messages and/or verify compliance of messages based on a value in a message or signal and based on a threshold.

A model may include a number of expected values for a signal or ID, e.g., for a respective number of contexts. For example, a model may include a first expected value to be received from an oil pressure unit when the engine is running (a first context) and another, different expected value from the oil pressure unit after the engine was turned off or when the engine is not running.

As shown by column 825, a model may include an expected rate of change. For example, with respect to the oil pressure example, values or signals received from the oil pressure unit may be expected to change by no more than 3 as shown in column 825 for ID 17 in table 800. For example, based on monitoring or learning values received from the oil pressure unit (e.g., in messages with an ID of "17"), an SEU may know that the values are typically between nine and eleven ("9-11") and may therefore set a threshold for a rate of change to three ("3") as shown. In some embodiments, if a rate of change of a value deviates, or is different from an expected rate of change then an SEU may determine the message is anomalous.

For example, with respect to the above exemplary oil pressure unit and table 800, if a first message with an ID of "17" include a value of three ("3") and a second message with an ID of "17" include a value of eight ("8") then the rate of change calculated by an SEU, e.g., by subtracting the first value from the second value, may be five ("8−3=5"). In such exemplary case, since the expected or allowed rate of change is three ("3") as shown in table 800, a rate of change that is eight ("8") may cause an SEU to determine an anomaly was detected. For example, the above exemplary case or scenario may be caused by a malicious software or other entity that has managed to gain access to an in-vehicle network (e.g., planted itself in a unit that controls the oil pressure sensor in an engine), is sending messages with an ID of "17", but is unaware that an SEU knows that a rate of change of values received with an ID of "17" is expected to be less than three ("3") and has therefore sent values that change at a rate that is higher than three ("3").

As shown by columns 830 and 835, a model may include thresholds that may be used in order to identify anomalies as described herein. For example, the threshold values in column 830 may be used, by an SEU, in order to determine whether or not a difference between the first and second values is allowed, acceptable or is in compliance with a content model. For example, referring to the above exemplary oil pressure unit and control case, if difference between first and second values or signal received with an ID of "17" is greater than two ("2"), e.g., greater than a difference threshold as indicated in column 830 for the top row that is related to ID "17" than an SEU may conclude that a threshold was breached and therefore an anomaly was detected, e.g., at least one of the first and second messages or signals are anomalous or are related to an anomaly.

Various and/or any number of, thresholds may be used. For example, a threshold related to a rate of change may be used as shown by column 835. For example, values of a specific signal received in a set or flow of message may comply with some, or even all the criteria and/or expected values in a model but may change at a rate that is above a rate change threshold. A rate of change of a signal or value may be calculated or determined, by an SEU as described herein. For example, referring to an exemplary model represented by table 800 and to the above oil pressure example, if values or signals received in messages with an ID of "17" change at a rate that is greater than five ("5") as indicated in threshold column 835 for the top row of ID "17", then an SEU may determine that at least some of the messages are anomalous or are related to an anomaly, e.g., some of the messages were not sent by unit 66 but by a malicious entity as described. As shown by column 587 and described herein with reference to FIG. 5, a model (e.g., model 136 that may include a timing model and a content model) may include an indication of an action to be performed. It will be noted that any action as described herein (e.g., with reference to FIG. 5) may be selected and performed, e.g., by an SEU, upon or when, identifying, detecting or determining, an anomaly related to content, e.g., based on a content model as described.

In some embodiments, a model may be created and/or updated by an embodiment of the invention. For example, by monitoring and examining messages communicated over an in-vehicle network and recording related content aspects (e.g., signal values as described), an SEU may create a model and dynamically, repeatedly and/or continuously update the model. For example, based on continuously and/or repeatedly monitoring, measuring, calculating or determining content aspects such as differences between signal values, rate of change of content and the like, an SEU may dynamically, repeatedly and/or continuously update threshold values or other criteria in a model used as described herein. It will be understood that an SEU may dynamically, repeatedly and/or continuously update a model by modifying or updating any data included in a model as described herein.

For example, an SEU may determine an expected content in messages with a specific ID and include or store, in model 136, an entry that indicates the expected content for the specific ID as well as any other data, values or information related to the ID as described herein. Based on monitoring and examining messages as described, an SEU may calculate or determine thresholds (e.g., as described) and update a model based on the thresholds. In some embodiments, thresholds related to content as described herein may be defined, calculated or set using any system or method. For example, using input devices 135 and/or output devices 145, a technician may connect a computer to a system and download thresholds, specifications of nodes or any other data into a content model, e.g., model 136 in storage 130.

An expected value in a model may be an expected result of a function, e.g., a model may include an expected rate of change derived or calculated using a function as described herein.

In some embodiments, (e.g., as described with reference to FIG. 5) given a specific deviation from an expected behavior (e.g., a breach of a specific threshold or a deviation from an expected content, possibly in a specific context), one or more actions may be selected and performed, by an SEU, based on a model. Any rules for processing messages as described herein may be included in a model, e.g., in the form of entries as shown in FIG. 8 that may be used by logic included in an SEU (e.g., in the form of executable code 125) to apply rules, determine an anomaly and select an action. Accordingly, an SEU may identify an anomaly based on a model and may select, upon identifying an anomaly, one or more actions to be performed as described.

It will be appreciated that, although for the sake of simplicity and clarity, a model is described herein using FIG. 5 and FIG. 8, a single model may include data as shown in FIG. 5 and FIG. 8 and described in related text herein. Of course, an embodiment may include two or more models, for example, an SEU may use a first model (e.g., as described and discussed with reference to FIG. 5) in order to enforce security, e.g., by observing or ensuring timing related compliance and use a second model (e.g., as described and discussed with reference to FIG. 8) in order to enforce security, by observing or ensuring content related compliance as described.

A content model may be provided to an embodiment, e.g., downloaded into storage system 130 as shown by model 136 wherefrom it may be read by an SEU 40. A content model may be created and/or updated by an embodiment. For example, an SEU 40 may create and update information in a content model based on examining and processing content in messages or signals as described herein, determining a context and updating a content model. A content model (e.g., model 136 or included therein) may be, or may be included in a file stored in storage system 130. Any other object or construct may be used in order to store and maintain a content or other model in storage system 130 or elsewhere, e.g., a linked or other list, a set of objects in a database and the like may be used in order to include a content or other model in a system.

Accordingly, a content model may include any definitions, thresholds or other data usable for determining whether or not a message or set or sequence of messages complies with a content model and/or is related to an anomaly, e.g., by determining a context and by comparing content attributes to values in a content model (e.g., values that may be context specific, in the content model as described). For example, table 800 shown in FIG. 8 and table 590 shown in FIG. 5 and described herein may be, or data similar data in these tables may be included in, a content model. The operations performed by a processor or an SEU may include creating, storing or maintaining a content model of an expected behavior of data messages or other communications over an in-vehicle communication network. For example, an SEU 40 may create and/or update a content model for, or related to, messages communicated over an in-vehicle communication network by recording or storing, per message ID and per context, attributes of content in messages.

In some embodiments, a system, e.g., a processor or controller and a non-transitory computer readable medium including instructions, may perform operations for enforcing a behavioral model for a vehicle as described herein. For example, when executed by one or more controllers or processors, instructions in one or more non-transitory computer readable memories may cause the processors to maintain a behavior model that includes or indicates expected content of data communications (e.g., messages) associated with a plurality of ECUs connected to an in-vehicle network; receive a data communication associated with one of the ECUs; compare, the received data communication with the behavior model or examine the received data communication with respect to the behavior model; determine, based on the comparing or examination, whether or not the received data communication complies with the behavior model; and, if the data communication does not comply with the model then perform, at least one action related to the message.

Reference is made to FIG. 9, a flowchart of a method of providing security to an in-vehicle communication network according to illustrative embodiments of the present invention. In some embodiments, the flow or method shown by FIG. 9 and described herein may be carried out by a system.

For example, a system, e.g., a processor or controller and a non-transitory computer readable medium including instructions, may perform operations for enforcing a behavioral model for a vehicle as described herein. For example, when executed by one or more controllers or processors, instructions in one or more non-transitory computer readable memories may cause the processors to maintain a behavior model that includes or indicates expected content of data communications (e.g., messages) associated with a plurality of ECUs connected to an in-vehicle network; receive a data communication associated with one of the ECUs; compare, the received data communication with the behavior model or examine the received data communication with respect to the behavior model; determine, based on the comparing or examination, whether or not the received data communication complies with the behavior model; and, if the data communication does not comply with the model then perform, at least one action related to the message.

As shown by block 910, a content model of, or related to, an expected behavior of messages or other data communications over the in-vehicle communication network may be maintained (e.g., created and updated). For example, an SEU may create and/or update model 136 based on content, metadata and payload in messages communicated over an in-vehicle network as described. As shown by block 915, a message sent on a network (e.g., a message sent by a node connected to an in-vehicle communication network) may be received. For example, SEU 40A may receive messages sent from nodes on CAN 61 via port 42 as described.

As shown by block 920, based on the model and based on at least one attribute of content in the message, it may be determined whether or not the message complies with the model. For example, a content attribute such as a difference in a signal or value included in messages with the same message ID may be calculated or determined (e.g., by subtracting the value in a first message from the value in a second message as described). An attribute of content as shown by block 920 may be a rate of change of a value calculated as described herein, or it may be an actual value in (or expected in) a message. A content attribute may be an error-detecting code or a verification code related to payload in a message. Any data or metadata related to a message may be considered, and treated, as an attribute of content by an SEU. For example, protocol data in a header (e.g., in ID as described) may be an attribute of content as shown by block 920. As described herein (e.g., with reference to FIG. 8) a model may include rules and criteria related to attributes of content, accordingly, based on an attribute of content in a message and based on the model, an embodiment may determine whether or not a message complies with the model.

As shown by block 925, at least one action related to the message may be performed if it is determined that the message does not comply with the model. For example, if a difference in a value in first and second messages is not as indicated or included in model 136 then an SEU may block at least one of the messages, raise, sound or display an alarm (e.g., using infotainment system 79), send an email to a predefined list of recipients, record the event (e.g., in storage 130 wherefrom records or entries may be downloaded for further analysis, e.g., in an offline procedure) etc.

Figure 10:
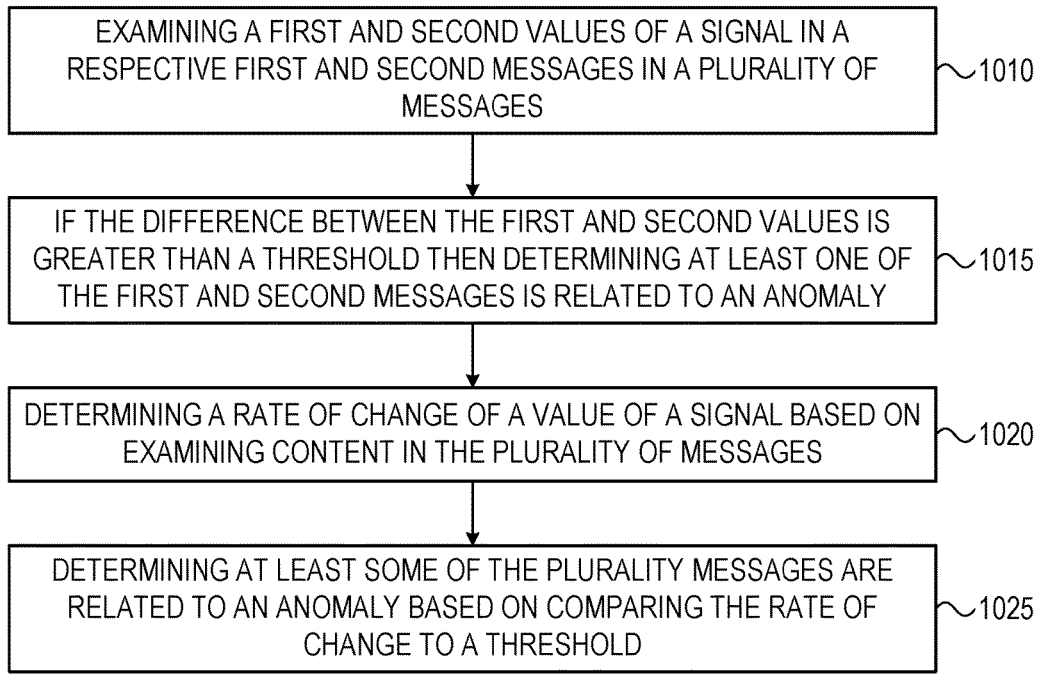
FIG. 10 shows a flowchart of a method according to illustrative embodiments of the present invention.

Reference is made to FIG. 10, a flowchart of a method of providing security to an in-vehicle communication network according to illustrative embodiments of the present invention. In some embodiments, the flow or method shown by FIG. 10 and described herein may be used, performed or carried out (e.g., by an SEU) in order to determining whether or not at least one of a plurality of messages complies with a model.

As shown by block 1010, first and second values of a signal in a respective first and second messages may be examined. For example, a node in a network may repeatedly send values of a signal (e.g., oil pressure value as described herein) and an SEU may examine the actual values of the signal as include in messages from the node. As shown by block 1015, if the difference between the first and second values is greater than a threshold then an embodiment may determine that at least one of the first and second messages is related to an anomaly. For example, if a difference between two values of the same signal, in two (e.g., consecutive) messages is greater than a threshold, as included in model 136, then an SEU may determine that at least one of the two messages is an anomalous message.

As shown by block 1020, a rate of change of a value of a signal may be determined based on examining content in a plurality of messages. For example, instead of or in addition to, determining that messages are related to an anomaly based on a difference determined and examined as shown by blocks 1010 and 1015, an SEU may determine whether or not the rate of change a signal in the messages is acceptable, e.g., below a threshold indicated in model 136. As shown by block 1025, an embodiment may determine at least some of a plurality messages are related to an anomaly based on comparing the rate of change to a threshold, e.g., based or by comparing a calculated or measured rate of change to a threshold in a model as described herein.

Generally, any function using at least two values may be used in order to calculate a rate of change, conceptually, a difference between two signals calculated by an SEU as described herein may be regarded as a rate of change In some embodiments, a rate of change may be calculated based on, or by using, the absolute values of the differences. In other embodiments, a rate of change may be calculated by using exponential smoothing on absolute values of differences. In yet other embodiments, a rate of change may be calculated by calculating a second derivative of a signal and enforcing a max or a min value to the second derivative. Accordingly, it will be understood that the scope of the invention is not limited by the method or logic used for calculating or determining a rate of change of a signal.

In some embodiments, determining a message is related to an anomaly may be based on a context. For example, and as described, different thresholds may be set, or included, in a model, for different contexts such that a first threshold, in a first context (e.g., first state of a vehicle or network) is used in order to determine a message is related to an anomaly and, a second, different threshold, in a second, different context (e.g., another, different, state of the vehicle or network) is used in order to determine a message is related to an anomaly. As described, an event related to at least one of: the vehicle, the network, and a node connected to the network may be identified (e.g., by an SEU and based on a message received from a node as described) and an SEU may determine a message is related to an anomaly based on the event. For example, an event may cause an SEU to change a context as described, and, since as described, an anomaly may be determined based on a context, effectively, an anomaly may be determined based on an event. In some embodiments, an SEU may record events and process messages and/or determine an anomaly was detected, based on the events. For example, an SEU may record a "driver door opened" event based on a received message, and, if another "driver door opened" message is received, e.g., before a "driver door closed" message, then the SEU may determine that at least one of the two "driver door opened" messages are anomalous or related to an anomaly. Any logic may be programmed into an SEU (e.g., in the form of executable code 125) such that any message or event may cause an SEU to determine messages are anomalous. For example, any sequence of messages may be programmed into (or known) by an SEU and accordingly, an SEU may identify anomalies by detecting a deviation of a flow of messages from a known sequence. For example, a simplified, exemplary, known sequence may be a "trunk opened" message then a "trunk closed" message and so on, and, accordingly, a sequence of "trunk opened" message followed by another "trunk opened" message without a "trunk closed" message between them may be identified by an SEU as an anomaly.

In some embodiments, if a message related to an anomaly is detected or identified as described (e.g., based on examining content in the message as described), an SEU may perform one or more actions, e.g., the SEU may isolate a portion of the network from the rest of the in-vehicle communication network in order to isolate the source of the message. In some embodiments, based on examining content as described, an SEU may determine a component connected to an in-vehicle communication network is malfunctioning. For example, specifications received from a manufacturer of a component may include specific error codes sent by the component in case of a malfunction, although not shown, a model may include such codes (e.g., specific error code for specific message IDs), accordingly, by examining data or content in messages as described and comparing or otherwise relating content to data in a model, an SEU may identify faulty components on a network. In some embodiments, an SEU may generate an indication related to a malfunctioning component, e.g., generate or raise an alert as described.

In some embodiments, an SEU may determine a message related to an anomaly based on a confidence level. In some embodiments, an SEU may select whether or not to perform an action and/or select an action to be performed based on a confidence level that may be determined with respect to an identification of an anomaly.

A level of confidence that an anomaly was indeed detected may be dependent on a combination factors, e.g., the node who sent the relevant message, the type of message, the message ID and/or the specific method used for detecting the anomaly. For example, the number of messages for which a threshold related to content was breached, e.g., the number of sequential (or back-to-back) of messages in which a content related was threshold may be used in order to determine a confidence level. For example, if content in three consecutive messages is not as expected then the confidence level or value for an anomaly, as determined by an SEU, may be less or lower than the confidence level or value for a sequence of five messages carrying unexpected content. A confidence level may be determined or calculated based in the number of violations, e.g., deviations of content from expected content as indicated in a model, per time unit, interval or period. For example, a confidence level of 0.4 may be determined if, during 100 ms, five messages carry content that is different from expected content and 0.8 if during 100 ms, seven messages include content that is different from expected content, e.g., as determined by comparing attributes of content to data in a model as described.

A device in an embodiment (e.g., an SEU 40) may calculate a confidence level or value of a message being related to an anomaly based on a ratio of anomalous message (or breaches or violations of thresholds) to a time period. For example, in a simplified case, if content different from expected content is identified eight ("8") times in a ten ("10") seconds time period then an SEU may calculate a confidence level by 8/10=0.8, and, if content different from expected content is identified three ("3") times in a ten ("10") seconds time, a lower confidence level may be calculated or determined by an SEU, e.g., 0.3<0.8. Upon, or based on identifying an anomaly or a message related to an anomaly, e.g., an anomaly related to content as described, an SEU may select to perform one or more actions, e.g., disable a component connected to a network, activate a component connected to the network, block a message, delay a message, limit a frequency of a message type, log a message and/or generate an alert as described herein.

An embodiment may determine, based on a model and based on counters in a plurality of messages, whether or not at least one of the plurality of messages complies with the model and/or whether or not at least one of the plurality of messages is related to an anomaly.

Figure 11:
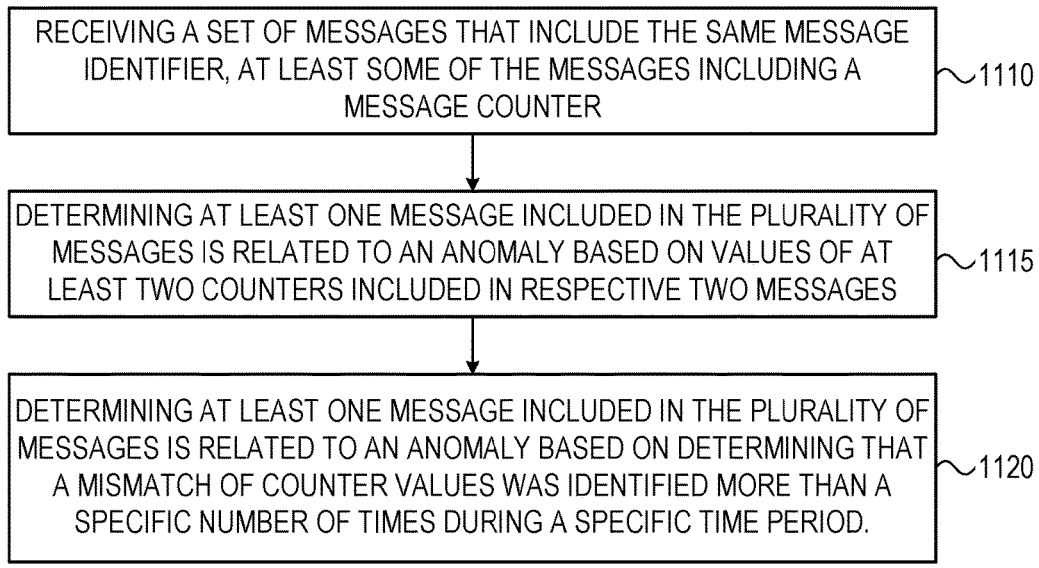
FIG. 11 shows a flowchart of a method according to illustrative embodiments of the present invention.

Reference is made to FIG. 11, a flowchart of a method of providing security to an in-vehicle communication network according to illustrative embodiments of the present invention. In some embodiments, the flow or method shown by FIG. 11 and described herein may be used, performed or carried out (e.g., by an SEU) in order to determine, based on counters, whether or not at least one of a plurality of messages complies with a model and/or is related to an anomaly.

As shown by block 1110, a set of messages that include the same message identifier may be received, at least some of the messages including a counter. For example, a set of messages received from traction control unit 64 may all include a specific, same ID value and may further include a counter. For example, each node on a network or bus may be assigned and/or configured to include in messages it sends, a specific (e.g., unique within a network) ID such that a source of a message may be readily determined Some nodes, units or components on a network may be configured to include a running counter in messages they send. For example, traction control unit 64 may include or set, for example in a protocol header of a message, a running counter value of one ("1") in a first message it sends, a value of two ("2") in a second or subsequent message and so on.

As shown by block 1115, an embodiment may determine at least one message included in a plurality of messages is related to an anomaly based on values of at least two counters included in respective two messages. For example, determining a message is related to an anomaly based on values counters may be as shown by the flows and methods shown by FIGS. 4A, 4B and 4C and described in related text herein.

In some embodiments, an SEU may determining a message is related to an anomaly based on a counter values and based on data in a model. For example, based on data in a model and based on comparing values of counters in first and second messages that include the same ID, an SEU may determine that at least one of the first and second messages is anomalous or is related to an anomaly.

It will be noted that counters placed or set in messages may not necessarily be placed, set or included in all messages and/or may not necessarily be incremented sequentially. For example, traction control unit 64 may place sequential counter values in messages it sends, e.g., set a running counter to the values of 1, 2, 3 and so on in a respective first, second, third messages but, anti-skid braking unit 66 may place or set values of a running counter in every other message, e.g., in first, third and fifth messages and so on, and suspension control unit 63 may set or include running counter values that are all even numbers, e.g., 2, 4, 6 and so on or values calculated based on any other logic or method, e.g., a specific (or even dynamically varying) gap or difference between counter values may be used. For example, logic according to which nodes determine or select of counters may be designed in order to prevent, or at least make it difficult for, a malicious entity to know (or guess) a counter value for a message based on a counter value of a previous message.

In some embodiments, a model may include any logic or other information that enables an SEU to know, determine, or calculate, an expected counter value. For example, based on an entry for an ID of messages as described, an SEU may, using a first counter value and data in a model, calculate or determine an expected second or next counter value.

For example, referring to the above exemplary logic used for counter values, based on data in model 136, an SEU may know or determine that counters received from suspension control unit 63 are all even numbers and, accordingly, the SEU does not determine an anomaly was detected when, following a counter value of eight ("8"), a value of ten ("10") is received. Similarly, based on data in model 136, an SEU may be aware that anti-skid braking unit 66 sets a valid counter value in every other message as described (and, for example, sets the counter value to a random number in other messages) and likewise, avoid falsely or wrongly determining an anomaly was detected when a difference between counter values, in two, consecutive messages received from anti-skid braking unit 66, is not a fixed or constant difference. Accordingly, an SEU may determine at least one message included in a plurality of messages is related to an anomaly based on values of at least two counters included in respective two messages and based on logic, attributes or other information related to counter values as indicated or included in a model.

As shown by block 1120, it may be determined that at least one message included in a plurality of messages is related to an anomaly based on determining that a mismatch of counter values was identified more than a specific number of times during a specific time period.

Generally, a counter mismatch, counter value mismatch or simply mismatch as referred to herein may relate to a case or event where a counter value included in a message is different from, or is other than, an expected counter value. A mismatch may be determined or identified based on a difference between values of counters, e.g., an SEU may identify or determine a mismatch by subtracting a value of a first counter from the value of a second counter. For example, if, based on data in a model, an SEU knows, or expects, a difference between two counter values in two consecutive messages received from a specific node (e.g., messages with the same ID) to be three "3" then a difference other than three may be identified, by the SEU, as a mismatch.

For example, based on information in a model as described and based on the last counter value seen or received, in a message with a specific ID, an SEU may determine or calculate an expected counter value of, or in, the next or following message, e.g., by applying, to the last counter value, logic for the specific ID as indicated in model 136. Accordingly, an SEU may identify, detect or determine a mismatch, e.g., if a value of a counter in a received message is different, or other than, an expected value.

Any logic may be used for processing counter values and determining one or more messages are related to an anomaly based on counter values. For example, an SEU may determine one or more messages are related to an anomaly if a mismatch of counter values was identified more than a specific number of times during a specific time period, e.g., as shown by the flows and methods shown by FIGS. 4A, 4B and 4C and described in related text herein.

An anomaly may be identified, determined or detected, by an SEU, if more than a specific or defined number of mismatches is identified during a time period or interval that is shorter than a specific or defined time period or interval. Generally, a number of mismatches per time unit may be referred to herein as a rate of mismatches or mismatch rate, accordingly, an SEU may identify, determine or detect an anomaly based on a mismatch rate.

In some embodiments, a model may include a different or specific mismatch rate for different or specific IDs. For example, based on data in a model, an SEU may identify or determine an anomaly if more than five ("5") counter mismatches are detected during a ten ("10") seconds time period in messages received from traction control unit 64 and may identify or determine an anomaly if more than seven ("7") counter mismatches are detected, during a ten ("10") seconds time period, in messages received from anti-skid braking unit 66. Accordingly, identifying or determining an anomaly based on a mismatch rate may further be based on a source or a message or an ID.

In some embodiments, an SEU may determine a message does not comply with the model or is related to an anomaly based on counter values as described and based on a context (that may be determined or defined as described herein). For example, model 136 may include, for a specific ID, a set of mismatch rates and/or a set of counter differences for a respective set of context. For example, the above exemplary mismatch rate of 5/10 for traction control unit 64 may be used in a first context (e.g., a speed higher than 55 mph) and a second, different mismatch rate, e.g., 3/10 may be included in model 136 and used by an SEU as described in a second, different context (e.g., a speed lower than 20 mph) Similarly, a set of expected differences between counter values as described herein may be included in model 136 and used by an SEU such that different differences are used for detecting anomalies or determining compliance of messages with a model for different contexts.

In some embodiments, an SEU may determine a message does not comply with the model or is related to an anomaly based on counter values as described and based on an event. For example, following an event, some nodes may change the logic according to which the calculate counter values. For example, following an event, a node may stop incrementing counter values in messages it sends, or set counter values in all messages it sends to a fixed, constant value (e.g., zero ("0")). A model may include data that indicates or describes an event and a logic used by a node for setting counter values following the event, accordingly, using such data, an SEU may process counter values based on events. An event may be related to one or more of: a vehicle, a network, and a node connected to the network. Any action, e.g., as described herein, may be taken by an SEU following a detection of an anomaly or incompliance with a model based on examining or processing counters as described.

Based on a mismatch or difference between counter values identified as described, an SEU may determine or identify that a component connected to an in-vehicle communication network is malfunctioning. For example, a constant counter value received in a set of messages from a node may indicate that at least the component that generates counter values in the node is malfunctioning. In other cases, a node or components may be configured or adapted to use a specific set of counter values for reporting a respective set of errors and a model may include a description or definition of such counter values and errors, accordingly, an SEU may determine a node is malfunctioning based on examining counter values as described.

Any applicable method, protocol or standard may be used, by an SEU, in order to validate messages and/or identify a malfunctioning component. For example, an SEU may examine a message authentication code (MAC) in received messages (e.g., messages generated according to the secure on-board communication (SecOC) and identify an anomaly or a malfunctioning component based on the MAC. For example, two messages that include the same MAC value, possibly, but not necessarily, during a time window shorter than a threshold, may cause an SEU to determine an anomaly (or anomalous message) was detected, e.g., identify an attack or such irregularity may cause an SEU to determine or identify a malfunctioning component.

An SEU may calculate a confidence level of a message being related to an anomaly based on counter values. For example, an SEU may calculate or determine a confidence value based on a mismatch rate. For example, a first confidence value may be determined or calculated by an SEU if two ("2") counter mismatches are detected during a ten ("10") seconds time period, e.g., a confidence level or value of 0.2 and a second confidence value may be determined or calculated by an SEU if five ("5") counter mismatches are detected during a ten ("10") seconds time period, e.g., a confidence level or value of 0.5.

An SEU may select, per ID, whether or not to perform an action based on a confidence level or value. For example, based on data in a model, an SEU may take no action if incompliance with a model is identified with a confidence level or value of 0.3 for messages with ID seven ("7") but may alert or disconnect a node from a network, if incompliance the same confidence level of 0.3, for messages with ID six ("6") is detected.

An action may be selected based on a confidence level or value. For example, based on data in a model, with respect to a specific message ID, an SEU may log detection of anomaly or incompliance if an anomaly, or incompliance or with a model, are identified with a confidence level or value of 0.3, may generate an alert if an anomaly, or incompliance or with a model, are identified with a confidence level or value of 0.5 and may disconnect from a network the node that sends the messages with the specific ID, if an anomaly, or incompliance or with a model, are identified with a confidence level or value of 0.8.

Some nodes may include, in messages they send, a code, counter or other data object that may be set according to a specific logic. For example, an ECU may include, either in a header of a message or in the payload of the message, a MAC in accordance with a SecOC scheme, for example such as defined by the Autosar standard. This MAC is expected to be unique for a set of messages, e.g., the value of the code is not expected to repeat more than once in a reasonable time frame. In some cases, a code inserted into messages as described changes (e.g., from a first message to an immediately following or subsequent message) according to a predefined, possibly constant, step, amount or value. For example, using a reference time T=0, a set or sequence of three messages received from an ECU at times 0, 100 ms and 200 ms may include a respective set of codes 10, 20 and 30.

An SEU may examine, process and/or keep track of any portion of a message (including any portion, object, range or offset in a message) and may, based on a set of values of the tracked portion, in a set of messages, identify an anomaly. For example, an SEU may examine, process and/or keep track of codes in messages in order to identify an anomaly. In some embodiments, an SEU may identify that a difference between values of, or in, first and second codes in a respective first and second messages it receives is not as expected and may, based on the unexpected difference, determine that at least one of the first and second messages is anomalous or is related to an anomaly. For example, with reference to the above example, if the sequence of codes that started with 10, 20 and 30 continues as in 10, 20, 30, 10 where 10 is the code in a fourth message received, then an SEU may determine that at least the fourth message is anomalous. For example, an intruder that is either unaware of the code in messages (and therefore left or allowed the portion of the code in a message to be a random value) or does not know the next expected code may send the fourth message with a (wrong) code of 10.

An SEU may identify an anomaly based on any sequence of codes. For example, still referring to the above example, if the sequence of codes that started with 10, 20 and 30 continues as in 10, 20, 30, 10, 40 where 40 is the code in a fifth message received then by examining the sequence of codes, an SEU may determine that at only the fourth message is anomalous since, by excluding the code of the fourth message, the sequence of codes is proper. Accordingly, by examining and tracking codes as described, an SEU may pinpoint an anomalous message. For example, and as described, an anomalous message identified based on codes as described may be ignored in, or excluded from, various calculations, e.g., the fourth message in the above example may be ignored when performing any timing or content related anomaly detection as described herein.

Various methods and systems may be used in order to enable an SEU to know or identify an expected behavior (or value) of codes. For example, a configuration parameter or value (e.g., in a model as described) may include any data or behavioral aspect required by an SEU in order to process codes as described, e.g., model 136 may include, for a specific message ID, a difference between consecutive codes in a message, the maximal value of a code (e.g., before a value in a code is repeated or is same as a value used in a previous message) and the like. In other embodiments, an SEU may automatically determine behavioral aspects of a code, e.g., by tracking values in messages, identifying a normal or typical difference between codes and/or determining a maximal value a code can include, an initial value of a code, e.g., a first value of a code used immediately after the maximal value is reached and the like.

In some cases, codes may be set or generated based on time. For example, a node may include in messages it sends codes that are generated based on the time of sending the messages. An SEU may be aware of any behavioral or other aspect of codes, including any logic used for generating codes. Accordingly, an SEU may validate a messages by determining, verifying or ascertaining that a code in a message matches a time of reception of the message. In a simplified case, a code in a message may be a timestamp and, in order to verify or validate a message, an SEU may determine whether or not a timestamp in the messages matches the time the message was received, possibly allowing a small variance, e.g., to accommodate the time between generation of the message at the sending node and the time the message was received and/or accommodate a clock difference between the SEU and sending node.

An SEU may compare a time period as represented by codes (e.g., timestamps or codes generated based on time) in received messages to a time period measured by the SEU, and, if the compared time periods are not substantially the same, the SEU may determine that one or more of the received messages is related to an anomaly. For example, if over a time period of 10 seconds as measured by an SEU, a set of timestamps in received messages represents a time period of 30 seconds (e.g., the difference between the last and first timestamps in the set is 30) then the SEU may determine that one or more of the received messages is anomalous, e.g., injected into a network by an attacker.

In some embodiments, values of a set of codes may be unique, e.g., in messages adhering to the SecOC standard. An SEU may record a set of received code values and may check if a value of a code received in a message is unique, e.g., not used in the last predefined or known number or past or received messages. For example, according to a protocol or standard, a value of a code starts at 1 and is increased in each message until it reaches 100 and then 1 is used again then an SEU may save (e.g., in storage 130) a sliding or moving window of the last 99 code values received such that the SEU can determine whether or not a received code is unique. If an SEU finds, identifies or determines that a code received in a message is not unique then the SEU may determine that an anomaly was detected, e.g., the message and/or some of the messages received before or after the message are related to an anomaly.

In some embodiments, speed of processing, efficiency, accuracy and/or other aspects may be served, improved or increased by excluding information, values or other data related to a message that is (or is suspected as being) related to an anomaly from a content related calculations and processing described herein.

For example, if an SEU 40 determines that a message is anomalous or is related to an anomaly as described then the SEU may exclude the message and its content or values from a calculation of a difference or a calculation of a rate of change and the like and/or otherwise ignore (or skip) the message and its content when updating a content model.

For example, an SEU may increase or improve efficiency, accuracy and/or other aspects or computational operations as described by ignoring, e.g., with respect to maintaining a model or with respect to calculating content related measures such as a rate of change, a message that is (or is suspected as being) related to an anomaly. An embodiment may improve anomaly detection accuracy by ignoring (with respect to anomaly detection) a message that is (or is suspected as being) related to an anomaly when processing subsequent messages, e.g., when processing a message received substantially immediately after an anomalous message. For example, false positives (e.g., wrongly detecting an anomaly where one does not exist or occur) that may be generated by known systems and methods may be avoided by some embodiments by ignoring in, or excluding from, calculation of rate of change, a message that does not comply with a content model, as described. Accordingly, embodiments of the invention may improve known systems and methods, e.g., known systems and methods related to content based anomaly detection in networks.

For example, in exemplary case, an SEU 40 may process first, second and third messages with the same ID as described and may calculate or update rate of change for the ID based on the content in the messages. Then, upon identifying that the fourth message with the same ID is an anomalous message (e.g., a value or signal in the fourth message is greater than the value or signal in the third message by more than a threshold), the SEU 40 may (in addition to performing one or more of the actions as described) ignore the fourth message with respect to rate of change calculations.

For example, in the above exemplary case, having identified that the fourth message is related to an anomaly, an SEU may ignore the fourth message and replace it with a fifth message in subsequent discovery or detection of anomalies, thus effectively ignoring the fourth (problematic or anomalous) message and/or excluding the content of the fourth message from calculation of a rate of change or other content related calculations as described herein. Skipping, excluding or ignoring a message (and its content) as described may enable avoiding wrongly identifying messages as anomalous.

Accordingly, an embodiment may, in real-time, identify an anomalous message, alert, block the message and/or perform other actions as described and further ignore the message in calculations and/or anomaly detection. Since, in some cases, an SEU 40 may receive and process messages in batches (e.g., batches of 5 or 10 messages), skipping, ignoring and/or excluding an anomalous message as described may greatly increase speed of processing, e.g., processing a batch of 10 messages that includes skipping a fourth anomalous message in the batch as described is fast and efficient. For example, including the content of an anomalous message (e.g., the fourth message in the above example) in calculations of a rate of change as described would wrongly change the rate of change thus negatively effecting the real-time aspects of a system, and may further result wrongly identifying proper messages as anomalous, causing false positive identifications and further negatively affecting real-time proper identification of anomalies.

Thresholds as described herein may be dynamic. An SEU 40 may update, define, or set an initial threshold for each message ID and/or context. For example, table 800 may initially be empty and, possibly during a learning stage or phase, an SEU 40 may populate thresholds (including context specific thresholds as described) for messages IDs by examining content of messages and recording or inserting values into table 800 as shown and described herein.

An embodiment may receive a plurality of messages and determine that at least one of the plurality of messages is related to an anomaly. For example, an SEU may receive first and a second messages that include (or have) the same ID value, e.g., first and a second messages with an ID value of "42" may be sent over an in-vehicle communication network and may be received via port 42 as described. An SEU may determine a time laps, or time interval, between the first and second messages. For example, if the first message (e.g., with ID value of "42") is received at a first time the is 10:43:33:234 (representing hours/minutes/seconds/milliseconds) and the second, or subsequent, message with the same ID value of "42" is received at a second time that is 10:43:33:244 then an SEU may subtract the first time from the second time and determine that the time laps is 10 milliseconds.

After determining a time laps between the receptions of the first and second messages as described, an SEU may find an entry, object or data related to the message ID value, for example, in model 136 (e.g., in the above exemplary case, an entry in table 580 with "42" in the ID column), and may thus find the time lapse threshold value for ID "42". An SEU may compare a time laps between receptions of the first and second messages to a threshold time laps and, if the time lapse between receptions of the first and second messages is less than a time lapse threshold then the SEU may determine that at least one of the first and second messages is related to an anomaly, e.g., the second message was sent by a malicious entity that has managed to infiltrate, or gain access to, an in-vehicle network and is sending messages over the in-vehicle network.

In a similar way, e.g., bay determining a time lapse as described and comparing it to a time lapse threshold, if an SEU determines that a time lapse between receptions of first and second messages is greater than a time lapse threshold then the SEU may determine that at least one of the first and second messages is related to an anomaly. For example, a model may include two time lapse thresholds that may be used such that an SEU may identify time lapses that are too short, and, in addition, identify time lapses that are too long. For example, a malicious entity that has managed to infiltrate, or gain access to, an in-vehicle network or to a node in the in-vehicle network may cause a node to malfunction and send messages with intervals that are longer than expected (e.g., miss or fail sending some messages), as described, by using a time lapse threshold for identifying time intervals that are longer than expected, an SEU may detect and handle such scenarios, e.g., isolate a node from a network in case a malicious entity has gained control of the node.

In some embodiments, counters may be used, e.g., in order to allow for some deviations from an expected timing of messages. For example, each time a deviation from an expected timing is identified or detected (e.g., a time lapse that is too long or too short as described) a counter may be increased such that the number of deviations (e.g., the number of sequential deviations) are counted. A different or specific counter may be maintained for each specific ID value such that an SEU may discreetly monitor timing deviations for each ID value.

If a counter that counts or records the number of deviations is greater than a counter threshold value, then an SEU may determine that at least one of the received messages is related to an anomaly. For example, a counter threshold value for message ID "42" may be "7" (e.g., "7" may be set of ID "42" in a counter threshold column in table 580), an SEU may increase a counter each time a timing deviation related to messages with an ID of "42" is identified and, if the counter reaches "8", the SEU may determine that an anomaly is identified for messages with ID "42".

In some embodiments, a counter that counts the number of timing deviations may be reset, or set to a predefined value (e.g., set to zero ("0")) if more than a predefined number of valid messages are received. Accordingly, if a few messages deviate from an expected timing constraint and, subsequently, messages are received with, or according to, proper or expected timing then an SEU may "forget" the deviations by resetting a counter as described such that a system may avoid what is known in the art as false positive detection. For example, cases where one message is lost (e.g., due to a spike on a hardware bus) may be ignored by an SEU by resetting a counter if a predefined number of consecutive valid messages are identified as described.

Valid messages as referred to herein may be a messages that do not violate a timing constraint. For example, a set of consecutive messages received with proper or expected time intervals between them may be regarded by an SEU (and referred to herein) as a set of valid messages. Accordingly, validating messages as referred to herein may be, or may include, determining that the time intervals between receptions of the messages are as expected, do not breach a threshold and/or comply with a model as described.

A message (or set or sequence of messages) may be considered, identified and/or treated as, by an SEU, valid in one context, or following a specific event or message and, the same message (or set or sequence of messages) may be considered, identified or treated as, by the SEU, invalid in another context or following another, different event. For example, a context may be changed (or set) to "diagnostic context" or "service context", e.g., an SEU may change a context by checking or marking an entry in table 590 upon receiving a message indicating that a diagnostics system was connected via an OBD port. After an event that includes or indicates connection of a diagnostic system and, for example, until an event that includes or indicates disconnection of the diagnostic system, an SEU may treat messages that would otherwise indicate violations, incompliances or anomalies as described as valid messages that require no action. Rules, criteria or conditions for ignoring messages that, in some contexts are considered anomalous may be ID specific or source specific. For example, a "door opened" message received from door control 75 while the vehicle is traveling 80 mph may be considered anomalous and may cause an SEU to take action as described but, the same "door opened" message received from door control 75 when the vehicle is stationary may be considered, by the SEU, as a valid message. Accordingly, a validity of a message, as determined by an SEU, may be based on a context.

A message or event may be considered, identified and/or treated, by an SEU, as indicating an anomaly (and may cause an SEU to perform an action as described) and, the same event or message may be considered, identified or treated as, by the SEU, as a valid or normal event or message. For example, a sudden large difference in values received from an oil pressure control unit may be identified by an SEU as an anomaly, e.g., based on a difference that is greater than a threshold as described, however, if a sudden rise in rpm is detected by an SEU (e.g., based on a message received from engine control unit 62) then a subsequent sudden large difference in values received from the oil pressure control unit may be regarded by an embodiment as normal and, in such exemplary case, an SEU may not regard a large difference of values received from the oil pressure control unit as anomalous or indicating an anomaly. Accordingly, in some embodiments, identifying an anomaly based on a messages or event may be based on one or more previous messages. In some embodiments, identifying an anomaly based on a messages or event may be based on one or more subsequent messages or events. For example, a sudden rise in rpm that may, in some cases, cause an SEU to determine an anomaly was detected may be regarded, by the SEU, as normal or non-anomalous if, immediately after a message that informs the SEU of the sudden rise in rpm is received, a message informing the SEU of a sudden large difference in values received from the oil pressure control unit or a message indicating an acceleration are received.

In another example an SEU may treat a first "door opened" message as valid but, unless a subsequent message from door control 75 is a "door closed" message, a second or subsequent "door opened" message may be treated, by the SEU, as invalid and may cause the SEU to take action as described. Accordingly, a validity of a message, as determined by an SEU, may be based on a message or based on a specific sequence of messages.

A time lapse threshold may be dynamically, continuously and/or repeatedly calculated, updated or modified. A time lapse threshold calculated, updated or modified as describe may be stored in a model, e.g., such that it may be used for subsequent operations and calculations as described herein. For example, in some embodiments, an SEU may (e.g., during an initial or learning stage or continuously) monitor and record time intervals between messages with a specific ID and calculate or determine a time lapse threshold for the ID based on the monitored and recorded time intervals. For example, based on monitoring as described, an SEU may calculate an average time interval for messages with ID "42", e.g., 100 milliseconds, and may then determine or calculate a time lapse threshold by subtracting a predefined value from the average time interval or by calculating a predefined percentage of the average time interval, e.g., in the current exemplary case, a threshold time interval calculated by an SEU may be 90 ms derived by "100−10=90" or a threshold time interval calculated by an SEU may be 85 ms derived by "100×0.85=85".

By continuously and/or repeatedly monitoring and recording time intervals between messages, continuously and/or repeatedly calculating an average as described and, continuously and/or repeatedly calculating a threshold time interval as described, an SEU may dynamically, continuously and/or repeatedly calculate and update a threshold time interval. A threshold time interval may be repeatedly updated in a model such the model is kept up-to-date and measurements or calculations are available, e.g., after a system is restarted. For example, storage system 130 (where model 136 may be stored) may be, or may include, a persistent storage device or component (e.g., a disk, or a USB component) and accordingly, any information stored in a model by an SEU may be available across resets of a system (e.g., data stored in model 136 during a first ride or trip may be available after the vehicle is turned off and on again, for a second trip).

An SEU may dynamically calculate, modify or update more than one time lapse threshold for each ID. For example, a first time lapse threshold used for determining whether or not a time lapse between messages is to short may be dynamically calculated and recorded as described and a second time lapse threshold used for determining whether or not a time lapse between messages is to long may be similarly calculated and recorded. For example, time lapse threshold used for determining whether or not a time lapse between messages is to long may calculated, by an SEU using subtraction or percentage, e.g., referring to the above exemplary case, a threshold time interval calculated by an SEU may be 120 ms derived by "100+10=120" or a threshold time interval calculated by an SEU may be 133 ms derived by "100×1.35=135". Any other logic or calculation may be used in order to calculate threshold time interval based on monitored time intervals as described.

Any number of thresholds, e.g., similar to the ones shown by columns 585 and 586 in FIG. 5 may be included in a model and may be used in order to determine whether or not a message is related to an anomaly or otherwise detect or identify an anomaly. In some embodiments, a number of different thresholds of the same type may be included in a model (and used as described) for one, specific or particular message, message type or ID. As referred to herein, a type of a threshold may generally relate to the behavior or aspect the threshold is used for. For example, a threshold used for time lapses as described herein may be referred to herein as a threshold of, having, or associated with, a "time lapse" type, a threshold used for time differences as described herein may be referred to herein as a threshold of type "time difference", and a threshold used for analyzing content, or identifying anomalies based on content in messages as described herein, may be referred to herein as a "content type" threshold.

For example, a number of thresholds of type "time lapse", e.g., three ("3") such thresholds for, or associated with, a specific ID, may be included in a model (e.g., additional columns similar to columns 585 and 586 may be included in a model) wherein the three thresholds are all related to time lapses that are too short, and each may be associated with its own threshold counter that counts the number of times the threshold was breached. For example, a first time lapse threshold may be included in a model and used for identifying or determining time lapses shorter than 10 ms and a respective first counter may be used for counting the number of times the first time lapse threshold was breached and, a second time lapse threshold may be included in a model and used for identifying or determining time lapses shorter than 5 ms and a respective second counter may be used for counting the number of times the second time lapse threshold was breached.

Accordingly, an SEU may detect or identify, for a single or specific ID, any number of different time lapse thresholds breaches related to any number of different time lapse thresholds. Although, for the sake of simplicity, the description of a plurality of thresholds of the same type associated with a single or specific ID refers to the "time lapse" type it will be understood that a plurality of thresholds of a specific type associated with an ID may be of any specific type, for example, a plurality of "content" thresholds may be set for, or associated with an ID such that any number of thresholds may be used for any type of violation.

For example, a set of different deviations from a time difference or time interval may be identified by an SEU using a respective set of, different, time difference thresholds, a set of different deviations from an expected content, may be identified by an SEU using a respective set of, different, content related thresholds as described and so on. Accordingly, it will be understood that any number thresholds of a specific type may be included in a model and used by an SEU in order to identify anomalies.

A time lapse threshold may be dynamically, continuously and/or repeatedly calculated, updated or modified based on a context. For example, a time lapse threshold may be dynamically modified (and/or update and stored in model 136), by an SEU, such that a first time lapse threshold is used when a vehicle is traveling more than 55 mph, and a second time lapse threshold may be selected and used when the vehicle is stationary. In some embodiments, an SEU may (e.g., by examining messages as described) determine a context of a vehicle, network or nodes on the network, e.g., the speed of the vehicle, accordingly, an SEU may dynamically, continuously and/or repeatedly calculate, update, modify and/or select a time lapse threshold. For example, a specific context may be determined, by an SEU, when a technician connects to the OBD port and the SEU may calculate or select one or more time lapse thresholds for this specific context, for example, time lapse thresholds selected when an authenticated connection to an OBD is identified (and a corresponding context is set, determined or defined) such that while a technician is updating a system an SEU does not interfere, (e.g., the time lapse thresholds may be dynamically set to values that cause the SEU to identify anomalies in extreme cases only). Although dynamically, continuously and/or repeatedly calculating, updating or modifying a threshold based on a context or event is described herein with respect to a time lapse threshold, it will be understood that any threshold, e.g., a time difference threshold or a threshold related to content as described herein may similarly dynamically, continuously and/or repeatedly calculated, updated and/or modified.

In some embodiments, a predefined value in a time lapse threshold may disable detection of anomalies. For example, a value of zero "0" or minus one "−1" may be used. For example, in order to disable detection while a technician is at work, when a context representing a technician is at work is identified and set as described, an SEU may set time lapse thresholds' values to minus one "−1" and consequently, the SEU may not alarm or act when time lapse thresholds are breached. Of course, when the technician disconnects from the system, a different, or new context may be detected, identified and set and time lapse thresholds' values may be calculated (or restored) based on the different or new context.

A time lapse threshold may be dynamically, continuously and/or repeatedly calculated, updated or modified, by an SEU, based on events. For example, an event detected or identified by an SEU may cause the SEU to update, change, determine or set a context. Accordingly, e.g., by setting a context according to an event (and calculating, updating or modifying time lapse thresholds based on contexts as described), an SEU may dynamically or repeatedly calculate, update or modify time lapse thresholds based on events. In some embodiments, a time lapse threshold may be calculated, updated or modified based on an event, possibly regardless of a context. For example, based on a control message (e.g., sent by a technician via an OBD port), an SEU may iterate through a set of time lapse threshold values (e.g., according to predefined steps or other logic), this may be done, for example, in order to identify the most suitable time lapse threshold values. Another exemplary event that may cause an SEU to dynamically, automatically or autonomously calculate, update or modify one or more time lapse thresholds (or values thereof) may be an identification or detection of a malfunction, e.g., identifying a malfunctioning node on a network. For example, having identified a malfunctioning node, an SEU may set time lapse threshold values for messages sent by the faulty node (e.g., for messages with a specific ID) such that an anomaly related to these messages is only determined in extreme cases. Accordingly, in addition to methods described herein, by modifying, determining, updating, calculating or setting time lapse threshold values based on contexts and events, an embodiment may determine a message is related to an anomaly based on a context or an event, e.g., since different time lapse threshold values are used for different contexts or are selected based on events and, anomalies may be identified based on time lapse thresholds, as a result, anomalies may be identified based contexts and events. Accordingly, some embodiments of the invention may determine a message is related to an anomaly based on a context and/or based on an event.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable the embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments include different features, not all of which are required in all embodiments. Some embodiments utilize only some of the features or possible combinations of the features. Variations of embodiments of the invention that are described, and embodiments including different combinations of features noted in the described embodiments, will occur to a person having ordinary skill in the art. The scope of the invention is limited only by the claims.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A system including a non-transitory computer readable medium including instructions that, when executed by at least one hardware processor, cause the at least one hardware processor to perform timing-based cyber-security operations, the operations including:
   maintaining a model of an expected timing behavior of data communications over an in-vehicle communication network, the model including a counter threshold value and a time laps threshold value;
   receiving first and second messages communicated over the in-vehicle communication network, wherein the first and second messages include the same message ID value;
   if the time lapse between receptions of the first and second messages is greater than the time laps threshold value then increasing a value in a counter;
   if the value in the counter is greater than the counter threshold value then determining at least one of the messages is anomalous; and
   if at least one of the first and second messages is anomalous then performing, by the processor, at least one action related to the anomalous message.

2. The system of claim 1, wherein
   if the time lapse between receptions of the first and second messages is less than a time lapse threshold included in the model then determining that at least one of the first and second messages is related to an anomaly.

3. The system of claim 1, wherein
   if the time lapse between receptions of the first and second messages is greater than the time lapse threshold then determining that at least one of the first and second messages is related to an anomaly.

4. The system of claim 1, wherein the processor is further configured to reset the counter to a predefined value if a predefined number of consecutive valid messages are identified.

5. The system of claim 1, wherein the processor is further configured to dynamically modify the time lapse threshold value.

6. The system of 1 claim, wherein the processor is further configured to:

determine a context related to at least one of: the vehicle, the network, and a node connected to the network; and
determine whether or not a message is related to an anomaly based on the context.

7. The system of claim 1, wherein the processor is further configured to:
identify an event related to at least one of: the vehicle, the network, and a node connected to the network; and
determine a message is related to an anomaly based on the event.

8. The system of claim 1, wherein the at least one action related to the message includes isolating a portion of the network from the rest of the in-vehicle communication network in order to isolate a source of a message related to an anomaly.

9. The system of claim 1, wherein the processor is further configured to:
determine a component connected to an in-vehicle communication network is malfunctioning based on one or more messages; and
generate an indication related to the malfunctioning component.

10. The system of claim 1, wherein if at least one message does not comply with the model then performing, by the processor, at least one action related to the message comprises:
calculating a confidence level of a message being related to an anomaly; and
performing an action based on the confidence level.

11. The system of claim 1, wherein an action related to the message is at least one of: disabling a component connected to the network, activating a component connected to the network, blocking a message, delaying a message, limiting a frequency of a message type, logging a message and alerting.

12. The system of claim 1, wherein the hardware processor is further configured to:
determine whether or not at least one of the messages complies with the model by:
comparing a time lapse between receptions of first and second messages to at least two time lapse thresholds; and
determining at least one of the messages does not comply with the model if at least one of the time lapse thresholds is breached.

13. A method comprising:
maintaining, by a hardware processor, a model of an expected behavior of data communications over an in-vehicle communication network, the model including a counter threshold value and a time laps threshold value;
receiving, by the processor, first and second messages sent over the in-vehicle communication network, wherein the first and second messages include the same message ID value;
if the time lapse between receptions of the first and second messages is greater than the time laps threshold value then increasing a value in a counter;
if the value in the counter is greater than the counter threshold value then determining, by the processor, least one of the messages is anomalous; and
if at least one of the messages is anomalous then performing, by the processor, at least one action related to the message.

14. The method of claim 13, comprising:
if the time lapse between receptions of the first and second messages is less than a time lapse threshold included in the model then determining that at least one of the first and second messages is related to an anomaly.

15. The method of claim 13, comprising:
if the time lapse between receptions the first and second messages greater than the time lapse threshold then determining that at least one of the first and second messages is related to an anomaly.

16. The method of claim 13, comprising:
if a time lapse between receptions of the first and second messages is less than a threshold value included in the model then increasing a counter, and
if the counter is greater than a counter threshold value included in the model then determining that at least one of the first and second messages is related to an anomaly.

17. The method of claim 16, comprising resetting the counter to a predefined value if a predefined number of consecutive valid messages are identified.

18. The method of claim 13, comprising dynamically modifying the counter threshold value.

19. A method for enforcing security in a communication network, the method comprising:
maintaining, by a hardware processor, a model related to messages communicated on an in-vehicle data communication network, the model including a counter threshold value and a time laps threshold value;
receiving first message and second message communicated on the in-vehicle data communication network, wherein the first and second messages include the same message ID value;
if the time interval between receptions of the first and second messages is greater than the time laps threshold value then increasing a value in a counter;
if the value in the counter is greater than the counter threshold value then determining, whether or not at least one of the first and second messages is related to an anomaly; and
if at least one of the first and second messages is related to an anomaly then performing at least one action related to the messages.

* * * * *